US00RE40006E

(19) United States
(12) Reissued Patent
Keefer et al.

(10) Patent Number: US RE40,006 E
(45) Date of Reissued Patent: Jan. 22, 2008

(54) FLOW REGULATED PRESSURE SWING ADSORPTION SYSTEM

(75) Inventors: Bowie G. Keefer, Vancouver (CA); David G. Doman, Surrey (CA)

(73) Assignee: QuestAir Technologies Inc., Burnaby, British Columbia (CA)

(21) Appl. No.: 10/823,471

(22) Filed: Apr. 12, 2004

Related U.S. Patent Documents

Reissue of:
(64) Patent No.: 6,063,161
Issued: May 16, 2000
Appl. No.: 08/637,176
Filed: Apr. 24, 1996

U.S. Applications:

(63) Continuation of application No. 10/150,784, filed on May 16, 2002, now Pat. No. Re. 38,493.

(51) Int. Cl.
*B01D 53/047* (2006.01)

(52) U.S. Cl. ..... 95/100; 95/103; 95/105; 95/116; 95/130; 96/124; 96/130; 96/133; 96/144; 137/625.46

(58) Field of Classification Search ..... 95/96–106, 95/113, 116, 130; 96/115, 124, 125, 130, 96/133, 143, 144; 137/625.46
See application file for complete search history.

(56) References Cited

U.S. PATENT DOCUMENTS 2,751,032 A * 6/1956 Ringo et al. ..... 96/124
2,751,033 A * 6/1956 Miller ..... 96/124
2,799,362 A * 7/1957 Miller ..... 95/113
2,877,861 A * 3/1959 Miller ..... 95/113
3,094,569 A * 6/1963 Thomas ..... 95/117
3,176,444 A * 4/1965 Kiyonaga ..... 95/96
3,204,388 A * 9/1965 Asker ..... 95/119
3,430,418 A * 3/1969 Wagner ..... 95/100
3,513,631 A * 5/1970 Seibert et al. ..... 95/125
3,594,984 A * 7/1971 Toyama et al. ..... 95/126
3,847,672 A * 11/1974 Trocciola et al. ..... 429/46
4,019,879 A * 4/1977 Rabo et al. ..... 95/140
4,144,037 A * 3/1979 Armond et al. ..... 95/95
4,153,434 A * 5/1979 Settlemyer ..... 96/111
4,200,682 A * 4/1980 Sederquist ..... 429/17
4,272,265 A * 6/1981 Snyder ..... 96/115
4,322,394 A * 3/1982 Mezey et al. ..... 423/244.11
4,354,859 A * 10/1982 Keller et al. ..... 95/96
4,371,380 A * 2/1983 Benkmann ..... 95/97
4,375,363 A * 3/1983 Fuderer ..... 95/97
4,406,675 A * 9/1983 Dangieri et al. ..... 95/26
4,452,612 A * 6/1984 Mattia ..... 95/100
4,469,494 A * 9/1984 van Weenen ..... 96/124
4,530,705 A * 7/1985 Firey ..... 96/116
4,555,453 A * 11/1985 Appleby ..... 429/41

(Continued)

FOREIGN PATENT DOCUMENTS

CA 1256038 * 6/1989

(Continued)

OTHER PUBLICATIONS

Vaporicyan and Kadiec, "Periodic Separating Reactors: Experiments and Theory", AIChE Journal 35, pp. 831–844 (May 1989).*

(Continued)

*Primary Examiner*—Frank M. Lawrence
(74) *Attorney, Agent, or Firm*—Klarquist Sparkman, LLP

(57) ABSTRACT

Pressure swing adsorption (PSA) separation of a gas mixture is performed in an apparatus with a plurality of adsorbent beds. The invention provides rotary multiport distributor valves to control the timing sequence of the PSA cycle steps between the beds, with flow controls cooperating with the rotary distributor valves to control the volume rates of gas flows to and from the adsorbent beds in blowdown, purge, equalization and repressurization steps.

22 Claims, 16 Drawing Sheets

U.S. PATENT DOCUMENTS 4,578,214 A * 3/1986 Jungerhans ..... 252/376
4,587,114 A * 5/1986 Hirai et al. ..... 423/247
4,595,642 A * 6/1986 Nakanishi et al. ..... 429/19
4,702,903 A * 10/1987 Keefer ..... 423/359
4,705,627 A * 11/1987 Miwa et al. ..... 210/264
4,726,816 A * 2/1988 Fuderer ..... 95/98
4,743,276 A * 5/1988 Nishida et al. ..... 95/140
4,758,253 A * 7/1988 Davidson et al. ..... 95/97
4,759,997 A * 7/1988 Ohyauchi et al. ..... 429/19
4,781,735 A * 11/1988 Tagawa et al. ..... 95/101
4,783,433 A * 11/1988 Tajima et al. ..... 502/74
4,790,858 A * 12/1988 Sircar ..... 95/101
4,801,308 A * 1/1989 Keefer ..... 95/96
4,816,121 A * 3/1989 Keefer ..... 204/156
4,914,076 A * 4/1990 Tsuji et al. ..... 502/407
4,917,711 A * 4/1990 Xie et al. ..... 95/106
4,925,464 A * 5/1990 Rabenau et al. ..... 96/124
4,963,339 A * 10/1990 Krishnamurthy et al. 423/437.2
4,968,329 A * 11/1990 Keefer ..... 95/98
4,969,935 A * 11/1990 Hay ..... 95/98
4,971,611 A * 11/1990 Noguchi ..... 96/123
4,988,580 A * 1/1991 Ohsaki et al. ..... 429/19
5,079,103 A * 1/1992 Schramm ..... 429/17
5,082,473 A * 1/1992 Keefer ..... 95/98
5,096,469 A * 3/1992 Keefer ..... 95/92
5,096,470 A * 3/1992 Krishnamurthy ..... 95/102
5,114,441 A * 5/1992 Kanner et al. ..... 95/98
5,126,310 A * 6/1992 Golden et al. ..... 502/417
5,133,784 A * 7/1992 Boudet et al. ..... 95/100
5,175,061 A * 12/1992 Hildebrandt et al. ..... 429/16
5,226,933 A * 7/1993 Knaebel et al. ..... 95/96
5,227,598 A * 7/1993 Woodmansee et al. ..... 219/700
5,246,676 A * 9/1993 Hay ..... 423/219
5,248,325 A * 9/1993 Kagimoto et al. ..... 96/124
5,256,174 A * 10/1993 Kai et al. ..... 96/116
5,258,571 A * 11/1993 Golden et al. ..... 585/829
5,268,021 A * 12/1993 Hill et al. ..... 95/98
5,271,916 A * 12/1993 Vanderborgh et al. ..... 423/246
5,282,886 A * 2/1994 Kobayashi et al. ..... 95/131
5,328,503 A * 7/1994 Kumar et al. ..... 95/101
5,366,818 A * 11/1994 Wilkinson et al. ..... 429/13
5,393,326 A * 2/1995 Engler et al. ..... 95/103
5,411,578 A * 5/1995 Watson et al. ..... 95/101
5,415,748 A * 5/1995 Emiliani et al. ..... 204/491
5,429,665 A * 7/1995 Botich ..... 95/99
5,431,716 A * 7/1995 Ebbeson ..... 96/125
5,434,016 A * 7/1995 Benz et al. ..... 429/13
5,441,559 A * 8/1995 Petit et al. ..... 96/125
RE35,099 E * 11/1995 Hill ..... 95/98
5,487,775 A * 1/1996 LaCava et al. ..... 95/98
5,509,956 A * 4/1996 Opperman et al. ..... 95/109
5,523,326 A * 6/1996 Dandekar et al. ..... 518/706
5,531,809 A * 7/1996 Golden et al. ..... 95/101
5,543,238 A * 8/1996 Strasser ..... 429/17
5,584,322 A * 12/1996 Poschl et al. ..... 137/625.46
5,593,478 A * 1/1997 Hill et al. ..... 96/111
5,593,480 A * 1/1997 Poschl ..... 96/124
5,604,047 A * 2/1997 Bellows et al. ..... 429/19
5,632,804 A * 5/1997 Schartz ..... 95/101
5,645,950 A * 7/1997 Benz et al. ..... 429/13
5,656,065 A * 8/1997 Kalbassi et al. ..... 95/96
5,656,067 A * 8/1997 Watson et al. ..... 95/101
5,658,370 A * 8/1997 Vigor et al. ..... 95/96
5,681,376 A * 10/1997 Wooten et al. ..... 96/124
5,711,926 A * 1/1998 Knaebel ..... 423/359
5,714,276 A * 2/1998 Okamoto ..... 429/17
5,730,778 A * 3/1998 Hill et al. ..... 95/12
5,766,311 A * 6/1998 Ackley et al. ..... 95/115
5,779,771 A * 7/1998 Wooten et al. ..... 96/124
5,811,201 A * 9/1998 Skowronski ..... 429/17
5,820,656 A * 10/1998 Lemcoff et al. ..... 95/96
5,827,358 A * 10/1998 Kulish et al. ..... 96/115
5,891,217 A * 4/1999 Lemcoff et al. ..... 95/96
5,900,329 A * 5/1999 Reiter et al. ..... 429/17
5,917,136 A * 6/1999 Gaffney et al. ..... 95/98
5,925,322 A * 7/1999 Werth ..... 422/170
5,955,039 A * 9/1999 Dowdy ..... 422/189
5,981,096 A * 11/1999 Hornburg et al. ..... 429/17
6,022,399 A * 2/2000 Ertl et al. ..... 95/114
6,045,933 A * 4/2000 Okamoto ..... 429/17
6,051,050 A * 4/2000 Keefer et al. ..... 95/96
6,056,804 A * 5/2000 Keefer et al. ..... 95/96
6,060,032 A * 5/2000 Hable et al. ..... 423/210
6,063,161 A * 5/2000 Keefer et al. ..... 95/100
6,143,057 A * 11/2000 Bulow et al. ..... 95/96
6,176,897 B1 * 1/2001 Keefer ..... 95/98
6,190,623 B1 * 2/2001 Sanger et al. ..... 422/192
6,190,791 B1 * 2/2001 Hornburg ..... 429/17
6,200,365 B1 * 3/2001 Eimer et al. ..... 95/19
6,231,644 B1 * 5/2001 Jain et al. ..... 95/96
6,283,723 B1 * 9/2001 Milburn et al. ..... 417/273
6,293,998 B1 * 9/2001 Dolan et al. ..... 95/96
6,296,823 B1 * 10/2001 Ertl et al. ..... 423/245.1
6,312,843 B1 * 11/2001 Kimbara et al. ..... 429/25
6,398,853 B1 * 6/2002 Keefer et al. ..... 96/125
6,406,523 B1 * 6/2002 Connor et al. ..... 96/125
RE38,493 E * 4/2004 Keefer et al. ..... 95/100
2002/0004157 A1 * 1/2002 Keefer et al. ..... 429/34
2002/0098394 A1 * 7/2002 Keefer et al. ..... 429/13

FOREIGN PATENT DOCUMENTS

CA 2016045 * 8/1994
CA 2109055 * 2/1999
CA 2087972 * 1/2000
CA 2087973 * 1/2000
DE 3913581 A1 * 11/1990
EP 0143537 A2 * 6/1985
EP 0341189 A1 * 8/1989
EP 0143537 B1 * 3/1990
EP 0512534 11/1992
EP 0681860 A2 * 7/1996
EP 0691701 A1 * 10/1996
EP 0750361 A * 12/1996
EP 1070531 A2 * 1/2001
EP 1095689 A1 * 5/2001
GB 2033777 * 5/1980
GB 2042365 * 9/1980
JP 59075574 A * 4/1984
JP 07094200 * 7/1995
JP 08045526 A2 * 2/1996
JP 10325360 A * 12/1998
JP 11214021 A2 * 8/1999
WO WO 94/04249 * 8/1992
WO WO 98/29182 * 9/1998
WO WO 99/28013 * 6/1999
WO WO 99/46032 * 9/1999
WO WO 00/16425 * 3/2000
WO WO 00/16880 * 3/2000

OTHER PUBLICATIONS

Chatsiriwech et al., "Enhancement of Catalytic Reaction by Pressure Swing Adsorption", Catalysis Today 20, Elsevier Science pp. 351–366 (1994).*

Hufton et al., "Sorption Enhanced Reaction Process for Hydrogen Production", AIChE Journal, vol. 45, No. 2, pp. 248–256 (Feb. 1999).*

International Search Report for PCT Application No. US01/48569 (Apr. 5, 2002).*

* cited by examiner 153
81
450
107
78
80
96
108
451
471
461
83
452
97
462
472
453
463
98
454
464
473
455
109
94
91
90
93
92
95
110
55
56
57
58
59
60

FLOW REGULATED PRESSURE SWING ADSORPTION SYSTEM

Matter enclosed in heavy brackets [ ] appears in the original patent but forms no part of this reissue specification; matter printed in italics indicates the additions made by reissue.

*The present application is a continuation of co-pending U.S. Reissue patent application No. 10/150,784, entitled "Flow Regulated Pressure Swing Adsorption System," filed on May 16, 2002, and to be issued as U.S. Pat. No. RE38,493 on Apr. 13, 2004, which is a reissue of U.S. patent application No. 08/637,176, entitled "Flow Regulated Pressure Swing Adsorption System," filed Apr. 24, 1996, now U.S. Pat. No. 6,063,161, the disclosures of which are hereby incorporated by reference.*

TECHNICAL FIELD

The invention relates to separations conducted by pressure swing adsorption (PSA). The present invention provides simplified controls, with enhanced flexibility of control adjustment through flow regulation under changing operating conditions.

BACKGROUND ART

Gas separation by pressure swing adsorption is achieved by coordinated pressure cycling and flow reversals over adsorbent beds which preferentially adsorb a more readily adsorbed component relative to a less readily adsorbed component of the mixture. The total pressure is elevated to a higher pressure during intervals of flow in a first direction through the adsorbent bed, and is reduced to a lower pressure during intervals of flow in the reverse direction. As the cycle is repeated, the less readily adsorbed or "light" component is concentrated in the first direction, while the more readily adsorbed or "heavy" component is concentrated in the reverse direction.

The conventional process for gas separation by pressure swing adsorption uses two or more adsorbent beds in parallel, with directional valves at each end of each adsorbent bed to connect the beds in alternating sequence to pressure sources and sinks, thus establishing the changes of working pressure and flow direction. Valves are required to control feed gas admission and discharge of gas enriched in the heavy component at the feed ends of the adsorbent beds, to control delivery of gas enriched in the light component at the product ends of the adsorbent beds, and to control depressurization and repressurization steps from either the feed or product ends of the beds.

Enhanced separation performance is achieved in well known PSA cycles using steps for each adsorbent bed of cocurrent feed at the higher cycle pressure, cocurrent initial blowdown, countercurrent final blowdown, countercurrent purge at the lower cycle pressure, and countercurrent pressurization. As disclosed by Kiyonaga (U.S. Pat. No. 3,176,444), Wagner (U.S. Pat. No. 3,430,418) and Fuderer et al (U.S. Pat. No. 3,986,849), improved product recovery can be obtained with more than two adsorbent beds operating in parallel, by performing pressure equalization steps between the separate beds so that a first bed undergoing a pressure reduction step exchanges gas which typically has been substantially purified to a second bed undergoing a pressure increase step so that the working pressure of the first and second beds is equalized to a pressure intermediate between the high and low pressures of the cycle.

With a greater number of beds, multiple pressure equalization steps can be achieved, although the valve logic and controls are then greatly complicated. Modern industrial scale PSA plants with six or more beds (e.g. as described by Fuderer et al for hydrogen purification) use a large number of two-way valves under computer control to establish both the cycle switching logic and adaptive flow control of each step.

It is well known that the complexity of valving in PSA systems may be reduced by use of multiport valves to establish the cycle switching logic. Thus, Synder (U.S. Pat. No. 4,272,265) has disclosed a rotary distributor valve for controlling high pressure feed and low pressure exhaust flows for an air separation pressure swing adsorption system with multiple beds. Use of a coaxially aligned pair of distributor valves, respectively controlling feed and product gas flows at opposite ends of the beds, was disclosed by van Weenen (U.S. Pat. No. 4,469,494), Hill (U.S. Pat. No. 5,112,367) and Hill et al (U.S. Pat. Nos. 5,268,021 and 5,366,541) have disclosed oxygen concentration PSA devices using multiport rotary valves with stationary adsorbent beds. The processes disclosed by van Weenan and Hill have pressure equalization steps conducted at respectively the product or feed ends of the adsorbent beds.

Prior art PSA systems with multiport distributor valves have been used commercially in small scale oxygen enrichment applications, as recommended by Dangieri et al (U.S. Pat. No. 4,406,675) for a rapid PSA process in which flow control is intentionally established by relatively steep pressure gradients in the adsorbent bed. The adsorbent bed must therefore be spring-loaded or otherwise immobilized to prevent attritional damage.

For large industrial PSA systems, mechanical immobilization of the adsorbent beds has not been practicable. Careful flow control is required to ensure that pressure gradients in the adsorbent bed are kept low, well below the onset of fluidization.

Mattia (U.S. Pat. No. 4,452,612) and Boudet et al (U.S. Pat. No. 5,133,784) disclose PSA devices using a rotary adsorbent bed configuration. The multiple adsorbent bed ports of an adsorbent bed rotor sweep past fixed ports for feed admission, product delivery and pressure equalization; with the relative rotation of the ports providing the function of a rotary distributor valve. Related devices are disclosed by Kagimoto et al (U.S. Pat. No. 5,248,325). All of these prior art devices use multiple adsorbent beds in parallel and operating sequentially on the same cycle, with multiport distributor rotary valves for controlling gas flows to, from and between the adsorbent beds.

An advantage of PSA devices with the adsorbent beds mounted on a rotary adsorbent bed assembly, as in the cited prior art inventions by Mattia and Boudet et al., is that function port connections for feed, exhaust, product and pressure equalization are made to the stator and are thus accessible to flow control devices. However, a rotary adsorbent bed assembly may be impracticable for large PSA units, owing to the weight of the rotating assembly. Also, when separating gas components which are highly inflammable or toxic, the rotary adsorbent bed assembly would need to be completely enclosed in a containment shroud to capture any leakage from large diameter rotary seals. Hence, PSA devices with stationary adsorbent beds will be preferred for larger scale systems, and for applications processing hazardous gases such as hydrogen.

In some of the above referenced prior art (e.g. Mattia, Boudet, and van Weenan), the rotary distributor valve would rotate continuously. Lywood (U.S. Pat. No. 4,758,253) and Kai et al (U.S. Pat. No. 5,256,174) have mentioned intermittent actuation of rotary multiport distributor valves for PSA systems, so that the distributor valve is stopped at a fully open position during each step of the cycle, and the distributor valve is then switched quickly to its next fully open position for the next step of the cycle.

It will be apparent that the multiport valves disclosed in the above cited inventions enable a simplification of PSA cycle switching logic, particularly those using multiple beds with pressure equalization steps, since the control functions of a multiplicity of two-way valves are consolidated into one or two multiport distributor valves. However, these prior art devices have limited utility except in small scale applications, owing to their lack of control flexibility. Since valve timing logic and port orifice sizing of the multiport valves are fixed rigidly in these prior art inventions, there is no provision for flow control to provide operational adjustment under changing feed conditions or during intervals of reduced product demand, or for performance optimization.

This inflexibility of control is most limiting for those of the cited prior art inventions which use multiport valves to exchange gas between a pair of beds, and across a pressure difference between that pair of beds. Such gas exchanges between pairs of beds arise in pressure equalization steps, in purge steps, and in product repressurization steps. For the PSA cycle to operate properly in a given application between given high and low pressures of the cycle, a correct amount of gas must be exchanged between a pair of beds in each such step, across the continuously changing pressure difference between that pair of beds during the step, and over the time interval of that step.

Especially in large industrial PSA systems, it is also necessary to avoid high velocity transients that could damage the adsorbent by excessive pressure gradients or fluidization. Such transients could occur as valve ports open at the beginning of an equalization or blowdown step. The internal geometry and orifice dimensions of a multiport distributor valve govern the amount of gas which can flow across a given pressure gradient over a given time interval. Once the internal orifice apertures of the rotary valves and piping connections have been fixed, the prior art PSA cycle using multiport valves could only operate correctly between given high and low pressures at one cycle frequency with a given feed composition, and would have no means for operational adjustment to optimize cycle performance.

Hence, prior art PSA devices with multiport valves would be unable to operate at much reduced cycle frequency during periods of reduced demand for purified product. It would be highly desirable to reduce cycle frequency when product demand is reduced, since lower frequency operation would be more efficient at lower flows, less stressful on the adsorbent and valve components, and less noisy in medical applications.

The ability to adjust operating frequency is also vital for applications where a product purity specification must be satisfied, while the highest attainable product recovery is desired from a feed mixture of given composition and flow rate and working between given higher and lower pressures. If the cycle frequency is too slow, the apparatus will release a relatively small exhaust flow at the lower pressure, resulting in high recovery of the light product at less than specified purity. If the cycle frequency is moderately too high, the apparatus will release a larger exhaust flow, achieving higher than desired purity and lower than desired recovery of the light product. If the cycle frequency is much too high, mass transfer effects may degrade performance to result in unsatisfactory light product purity as well as low recovery. Such applications arise for example in industrial hydrogen purification. In these applications, cycle frequency must be adjustable in order to achieve specified purity and simultaneously high recovery of the light product.

None of the cited prior art for pressure swing adsorption with multiport valves addresses the combined need for adjustable cycle frequency control and adjustable flow controls for gas exchanges between pairs of adsorbent beds. There is no flow control other than the pressure drop resistance of the conduits and the valve ports as they open and close. Hence, these devices as disclosed have the operational limitation that they cannot be operated at significantly varied conditions of cycle frequency and pressure.

It is well known that there is much scope for optimization of PSA cycles by adjusting the pressure intervals taken up by different steps. For example, Suh and Wankat (AIChE Journal 35, pages 523–526, 1989) have published computer simulation results showing the sensitivity to adjustment between the pressure intervals allocated to cocurrent and countercurrent blowdown. They showed that the optimum split between the pressure intervals for cocurrent and countercurrent blowdown is sensitive to the feed gas composition and the adsorbent selectivity. Product recovery performance is degraded by operation away from the optimum operating point.

The above cited PSA devices with multiport distributor valves lack any control means for making adjustments between the pressure intervals taken up by the different steps of the cycle. It would be very desirable to provide a control system capable of such adjustment while the PSA system is operating.

A further limitation of the prior art for PSA devices using multiport valves is the lack of control means to establish relatively smooth and constant flow over each step. Such control means could usefully alleviate the flow inrush at the beginning of each step when valve ports open across pressure differences, thus protecting the adsorbent bed and valve ports from transient flow velocities much in excess of the average flow during each step. Such control means could also minimize the time intervals of zero or much below average flow velocity during valve switching between steps, thus enhancing the productivity of the apparatus.

DISCLOSURE OF INVENTION

The pressure swing adsorption (PSA) process separates a feed gas containing a first component which is more readily adsorbed, and a second component which is less readily adsorbed, on an adsorbent material installed in adsorbent beds. The PSA apparatus has a number "N" of adsorbent beds operating in parallel, and phased 360°/N apart in operating sequence. Each adsorbent bed has a flow path through the adsorbent material, the flow path having a first end to which the more readily adsorbed fraction of the feed gas mixture is separated by the PSA process, and a second end to which the less readily adsorbed fraction of the feed gas mixture is separated. Cocurrent flow in the flow path is directed from the first to the second end of the flow path, and countercurrent flow is directed from the second to the first end of the flow path.

Pressure swing adsorption processes, including that of the present invention, include some or all of the following sequential and cyclically repeated steps for each of the adsorbent beds:

(A) feed step at the higher pressure of the cycle, (B) one or more equalization steps for initial depressurization of the bed from the higher pressure to approach an equalization pressure, while gas withdrawn to depressurize the bed is supplied to another bed being pressurized in its step (F) toward the same equalization pressure, (C) cocurrent blowdown of the bed to an intermediate pressure lower than the lowest equalization pressure but higher than the lower pressure, (D) countercurrent blowdown of the bed to approach the lower pressure, (E) purge step at substantially the lower pressure, with countercurrent flow of gas from step (C), (F) equalization step(s) repressurizing the bed to approach an equalization pressure, with gas supplied to pressurize the bed being withdrawn from another bed undergoing step (B), (G) repressurization of the bed to approach the higher pressure.

The present invention achieves pressurization and depressurization steps primarily by gas exchanges between the adsorbent beds. Steps entailing exchange of gas enriched in the second component between adsorbent beds will be described as light reflux steps. A predetermined logical sequence of the process steps will be established by rotary distributor valves, while flow regulation controls will enable satisfactory operation under varied process conditions and under varied cycle frequencies so that required product purity, recovery and output can be achieved by a simple control strategy.

The following terminology and definitions will be used hereunder for PSA devices using multiport distributor rotary valves. The first and second ends of the adsorbent beds are respectively connected in parallel to control valves which in the present invention include multiport distributor valves, a first distributor valve connected to the first ends of the adsorbent beds, and a second distributor valve connected to the second ends of the beds.

Each rotary valve has two relatively rotating ported valve elements, respectively the valve stator and rotor. The relative rotation of the valve elements sliding on a close contact sealing valve surface brings the ports of each element into sequential engagement. The valve surface is a surface of revolution, centered on the axis of revolution. The valve surface may be defined by flat discs, cones, circular cylinders, or other surface of revolution. The radial and axial position on the valve surface of a cooperating set of ports on the two valve elements must substantially coincide.

The adsorbent beds are connected to adsorbent bed ports on one of the valve elements, here described as the bed port element. External connections for feed supply, product delivery and exhaust discharge are made to function ports on the other valve element, here described as the function port element. Other function ports on the function port element will be provided for product reflux steps or for gas exchanges between pairs of adsorbent beds, e.g. for purge or pressure equalization steps.

The function ports have a critical role in defining the sequence and flow intervals for bed pressurization and blowdown steps. The present invention provides adjustable flow regulation controls, e.g. throttle orifices, on the conduits connecting pairs of function ports provided for gas exchanges between adsorbent beds. These flow controls may cooperate directly with either the bed port element or the function port element. In the example of pressure equalization steps, the flow controls must establish sufficient gas flow over the time interval of that pressure equalization step to achieve the desired pressure changes in the beds undergoing equalization, while avoiding excessively high transient gas flows that may damage the adsorbent. Adjustability of the flow controls is required to achieve a satisfactory pressure and flow regime, particularly when changing the PSA cycle frequency, working pressures, or feed gas composition or temperature.

The invention provides a process for separating first and second components of a feed gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency of the process defining a cycle period; providing for the process a plurality of adsorbent beds of the adsorbent material with a number "N" of substantially similar adsorbent beds, with said adsorbent beds having first and second ends; and further providing for the process a first rotary distributor valve connected in parallel to the first ends of the adsorbent beds and a second rotary distributor valve connected in parallel to the second ends of the adsorbent beds, with flow controls cooperating with the first and second distributor valves; introducing the feed gas mixture at substantially the higher pressure to the first distributor valve; and rotating the first and second distributor valves so as to perform in each adsorbent bed the sequentially repeated steps within the cycle period of:

(A) supplying a flow of the feed gas mixture at the higher pressure through the first distributor valve to the first end of the adsorbent bed during a feed time interval, withdrawing gas enriched in the second component (light reflux gas) from the second end of the adsorbent bed, and delivering a portion of the gas enriched in the second component as a light product gas, (B) withdrawing a flow of gas enriched in the second component (light reflux gas) from the second end of the adsorbent bed through the second distributor valve, so as to depressurize the adsorbent bed from the higher pressure toward an equalization pressure less than the higher pressure, while controlling the flow so that the pressure in the bed approaches the equalization pressure within an equalization time interval, and also controlling the flow so as to limit the peak flow velocity exiting the second end of the adsorbent bed in that time interval so as to avoid damaging the adsorbent, (C) withdrawing a flow of gas enriched in the second component (light reflux gas) from the second end of the adsorbent bed through the second distributor valve, so as to depressurize the adsorbent bed from approximately the equalization pressure to an intermediate pressure less than the equalization pressure and greater than the lower pressure, while controlling the flow so that the pressure in the bed reaches approximately the intermediate pressure within a cocurrent blowdown time interval, and also controlling the flow so as to limit the peak flow velocity exiting the second end of the adsorbent bed in that time interval so as to avoid damaging the adsorbent, (D) withdrawing a flow of gas enriched in the first component (countercurrent blowdown gas) from the first end of the adsorbent bed through the first distributor valve, so as to depressurize the adsorbent bed from approximately the intermediate pressure to approach the lower pressure, while controlling the flow so that the pressure in the bed approaches the lower pressure within a countercurrent blowdown time interval, and also controlling the flow so as to limit the peak flow velocity adjacent the first end of the adsorbent bed in that time interval so as to avoid damaging the adsorbent, (E) supplying a flow of gas enriched in the second component (light reflux gas) from the second distributor valve to the second end of the adsorbent bed at substantially the lower pressure, while withdrawing gas enriched in the first component from the first end of the adsorbent bed and through the first distributor valve over a purge time interval, the flow of gas enriched in the second component from the second distributor valve being withdrawn from another of the adsorbent beds which is undergoing cocurrent blowdown step (C) of the process, (F) supplying a flow of gas enriched in the second component (light reflux gas) from the second distributor valve to the bed, so as to repressurize the adsorbent bed from approximately the lower pressure to approach the equalization pressure, while controlling the flow so that the pressure in the bed approaches the equalization pressure within an equalization time interval, and also controlling the flow so as to limit the peak flow velocity entering the first end of the adsorbent bed in that time interval so as to avoid damaging the adsorbent, the flow of gas enriched in the second component from the second distributor valve being withdrawn from another of the adsorbent beds which is undergoing equalization step (B) of the process, (G) supplying a flow of gas enriched in the second component (light reflux gas) from the second distributor valve to the bed, so as to repressurize the adsorbent bed from the equalization pressure to approach the higher pressure, while controlling the flow so that the pressure in the bed approaches the higher pressure within a repressurization time interval, and also controlling the flow so as to limit the peak flow velocity entering the second end of the adsorbent bed in that time interval so as to avoid damaging the adsorbent, the flow of gas enriched in the second component from the second distributor valve being withdrawn from another of the adsorbent beds which is undergoing feed step (A) of the process, (H) cyclically repeating steps (A) to (G).

Steps (A) to (F) inclusive are conducted successively in the "N" adsorbent beds, in different phases separated by a fraction "1/N" of the cycle period.

The invention provides an apparatus for separating the first and second components of the feed gas mixture, with:

(a) a number "N" of substantially similar adsorbent beds of the adsorbent material, with said adsorbent beds having first and second ends defining a flow path through the adsorbent material;

(b) light product delivery means to deliver a light product flow of gas enriched in the second component from the second ends of the adsorbent beds;

(c) a first rotary distributor valve connected in parallel to the first ends of the adsorbent beds; the first distributor valve having a stator and a rotor rotatable about an axis; the stator and rotor comprising a pair of relatively rotating valve elements, the valve elements being engaged in fluid sealing sliding contact in a valve surface, the valve surface being a surface of revolution coaxial to the axis, each of the valve elements having a plurality of ports to the valve surface and in sequential sliding registration with the ports in the valve surface of the other valve element through the relative rotation of the valve elements; one of said valve elements being a first bed port element having N first bed ports each communicating to the first end of one of the N adsorbent beds; and the other valve element being a first function port element having a plurality of first function ports including a feed port, a countercurrent blowdown port and a purge exhaust port; with the bed ports spaced apart by equal angular separation between adjacent ports; and with the first function ports and first bed ports at the same radial and axial position on the valve surface so that each first function port is opened in sequence to each of the N first bed ports by relative rotation of the valve elements;

(d) a second rotary distributor valve connected in parallel to the second ends of the adsorbent beds and cooperating with the first distributor valve; the second distributor valve having a stator and a rotor rotatable about an axis; the stator and rotor comprising a pair of relatively rotating valve elements, the valve elements being engaged in fluid sealing sliding contact in a valve surface, the valve surface being a surface of revolution coaxial to the axis, each of the valve elements having a plurality of ports to the valve surface and in sequential sliding registration with the ports in the valve surface of the other valve element through the relative rotation of the valve elements; one of said valve elements being a second bed port element having N second bed ports each communicating to the second end of one of the N adsorbent beds; and the other valve element being a second function port element having a plurality of second function ports including a plurality of light reflux withdrawal ports and light reflux return ports, with each light reflux return port communicating through the second function element to a light reflux withdrawal port; with the bed ports spaced apart by equal angular separation between adjacent ports; and with the function ports and bed ports at the same radial and axial position on the valve surface so that each function port is opened in sequence to each of the N bed ports by relative rotation of the valve elements;

(e) drive means to establish rotation of the rotors, and hence relative rotation of the bed port elements and the function port elements, of the first and second distributor valves, with a phase relation between the rotation of the rotors and angular spacing of the function ports of the first and second distributor valves so as to establish for each adsorbent bed communicating to corresponding first and second bed ports the following sequential steps and cyclically repeated steps for those bed ports;

(i) the first bed port is open to the feed port, while light product gas is delivered by a light product delivery valve, (ii) the second bed port is open to a light reflux withdrawal port, (iii) the first bed port is open to the countercurrent blowdown port, (iv) the first bed port is open to the purge exhaust port, while the second bed port is open to a light reflux return port;

(f) countercurrent blowdown flow control means cooperating with the first distributor valve; (g) light reflux flow control means cooperating with the second distributor valve; (h) feed supply means to introduce the feed gas mixture to the feed port of the first distributor valve at substantially the higher pressure; and (i) exhaust means to remove gas enriched in the first component from the purge exhaust port of the first distributor valve.

The flow control means cooperating with the first and second distributor valves (for respectively countercurrent blowdown and light reflux steps) may be provided as continuously adjustable orifices (e.g. throttle valves), or as discretely adjustable orifices with selector valves to switch between discrete settings. The light reflux flow control means may be provided as adjustable orifices within the rotor of the second distributor valve, or as adjustable orifices interposed between the second end of each of the adsorbent beds and the second distributor valve.

Figure 1:
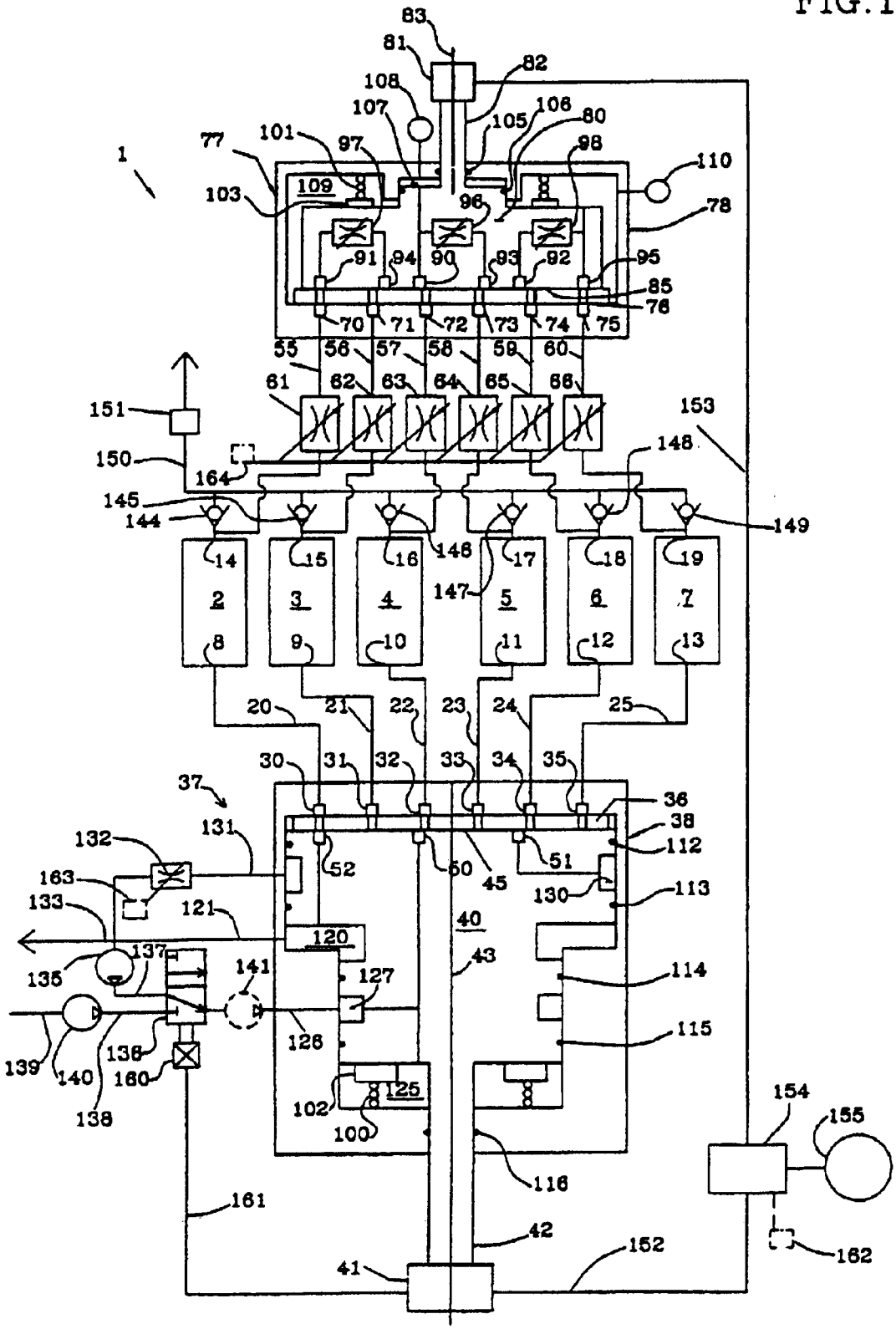
FIG. 1 shows a simplified schematic of a six bed PSA apparatus with one pressure equalization step.

It is noted that FIGS. 1, 8, 10, 11 and 13 are schematic diagrams of embodiments of the invention, showing rotary distributor valves in longitudinal section along their axis of rotation. In order to illustrate the interconnections of the apparatus, all of the bed ports and function ports of the depicted distributor valves are shown in these simplified schematics; with the ports therefore shown in arbitrary positions not representing the actual geometric arrangement of the ports as provided for example in the axial sections of FIGS. 2 and 3. Geometrically true longitudinal sections of these valves (such as FIG. 15) would show at most pairs of bed ports and function ports at a single radial distance on opposite sides of the axis of rotation.

MODES FOR CARRYING OUT THE INVENTION

FIG. 1

A pressure swing adsorption apparatus 1 is operated in a pressure swing adsorption cycle at an cyclic frequency characterized by a period "T". The apparatus has a number "N"=6 of substantially similar adsorbent beds 2, 3, 4, 5, 6 and 7. The beds have first ends 8, 9, 10, 11, 12 and 13; and second ends 14, 15, 16, 17, 18 and 19. The adsorbent material in each bed defines a flow path between first and second ends of that bed.

The first end of each adsorbent bed communicates by bed conduits 20, 21, 22, 23, 24 and 25 to corresponding first bed ports 30, 31, 32, 33, 34 and 35 in stator 36 of first rotary distributor valve 37. The stator is attached within stator housing 38, by sealing means such as adhesive bonding so that no pathway is provided between the stator and stator housing for gas leakage between the bed conduits.

The first distributor valve includes a rotor 40, driven by first valve drive means 41 through shaft 42 about axis of rotation 43. The rotor 40 and stator 36 are engaged in mutual fluid sealing sliding contact on valve surface 45, which is a surface of revolution about axis 43. The bed ports 30–35 open to valve surface 45. The rotor has a plurality of first function ports also open to the valve surface, including a feed port 50, a countercurrent blowdown port 51 and a purge exhaust port 52.

The rotor and stator are the relatively rotating valve elements of the distributor valve. The stator may be described as the first bed port element of the valve, while the rotor is the first function port element of the valve.

The second end of each adsorbent bed communicates by one of conduits 55, 56, 57, 58, 59 and 60 through light reflux flow controls (e.g. adjustable orifices) 61, 62, 63, 64, 65 and 66 respectively to corresponding second bed ports 70, 71, 72, 73, 74 and 75 in stator 76 of second rotary distributor valve 77. The stator is attached within stator housing 78 so that no pathway is provided between the stator and stator housing for gas leakage between the bed conduits. The rotor and stator are the relatively rotating valve elements of the distributor valve. The stator may be described as the second bed port element of the valve, while the rotor is the second function port element of the valve.

The second distributor valve includes a rotor 80, driven by second valve drive means 81 through shaft 82 about axis of rotation 83. The rotor 80 and stator 76 are engaged in mutual fluid sealing sliding contact on valve surface 85, which is a surface of revolution about axis 83. The bed ports 70–75 open to valve surface 85. The rotor has a plurality of second function ports also open to the valve surface.

The second function ports are provided as pairs of light reflux withdrawal and light reflux return ports, with each light reflux withdrawal port communicating to a light reflux return port through an adjustable orifice in rotor 80. Light reflux withdrawal port 90 communicates through adjustable orifice 96 in the rotor to light reflux return port 93. Light reflux withdrawal port 91 communicates through adjustable orifice 97 in the rotor to light reflux return port 94. Light reflux withdrawal port 92 communicates through adjustable orifice 98 in the rotor to light reflux return port 95.

Figure 2:
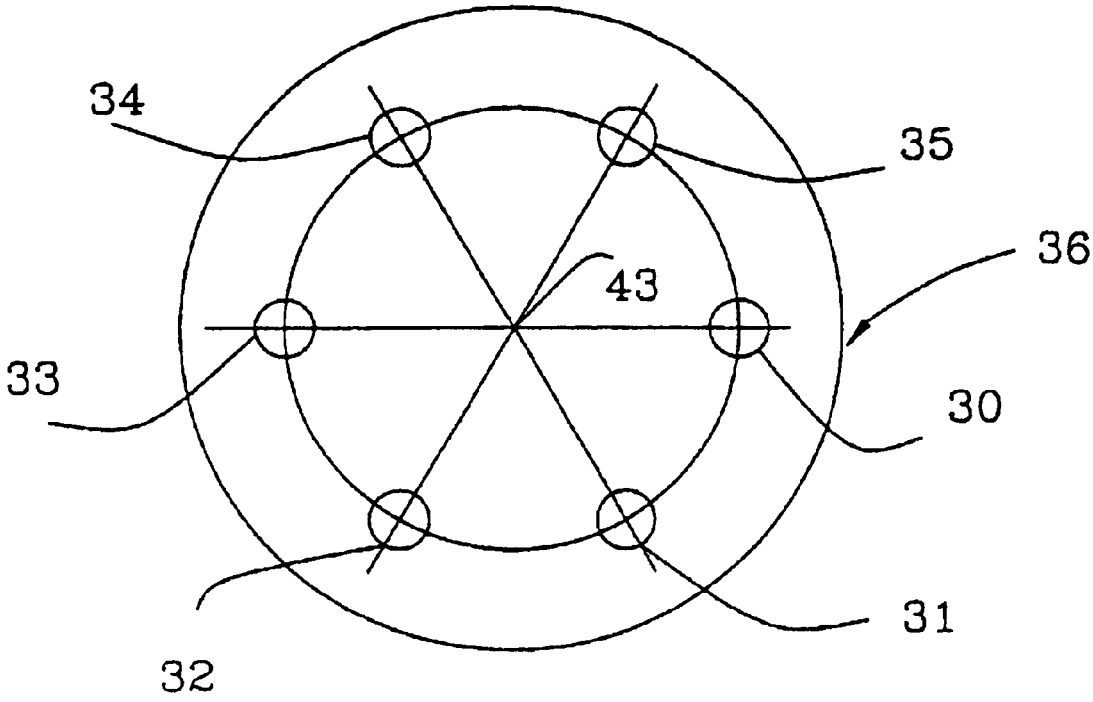
FIG. 2 shows the valve port geometry for the first distributor valve of the apparatus of FIG. 1.
Figure 2:
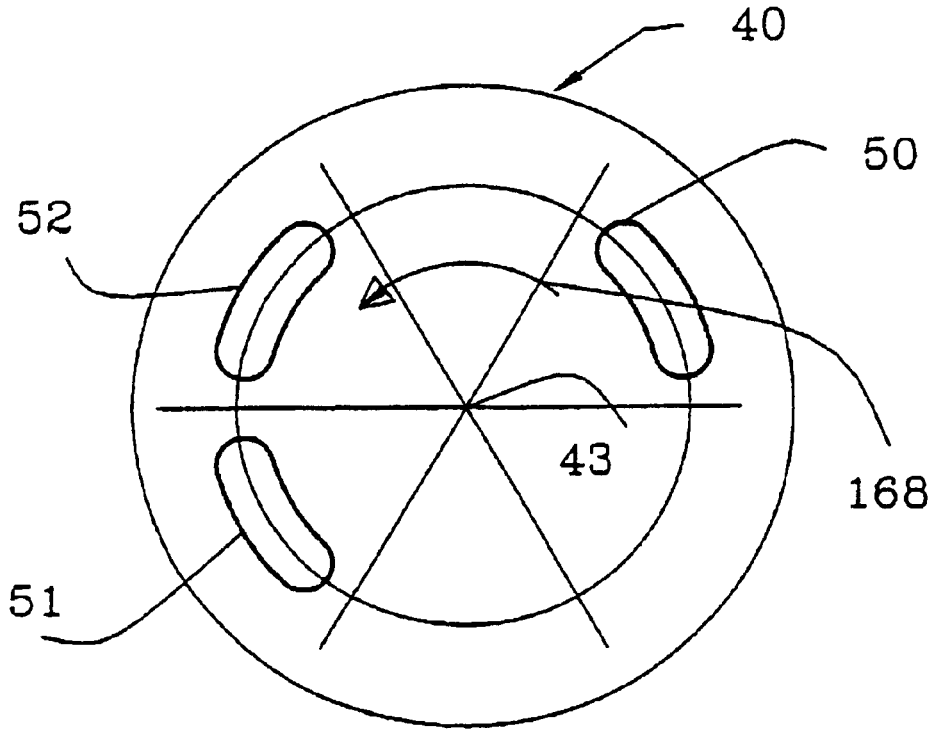
Figure 3:
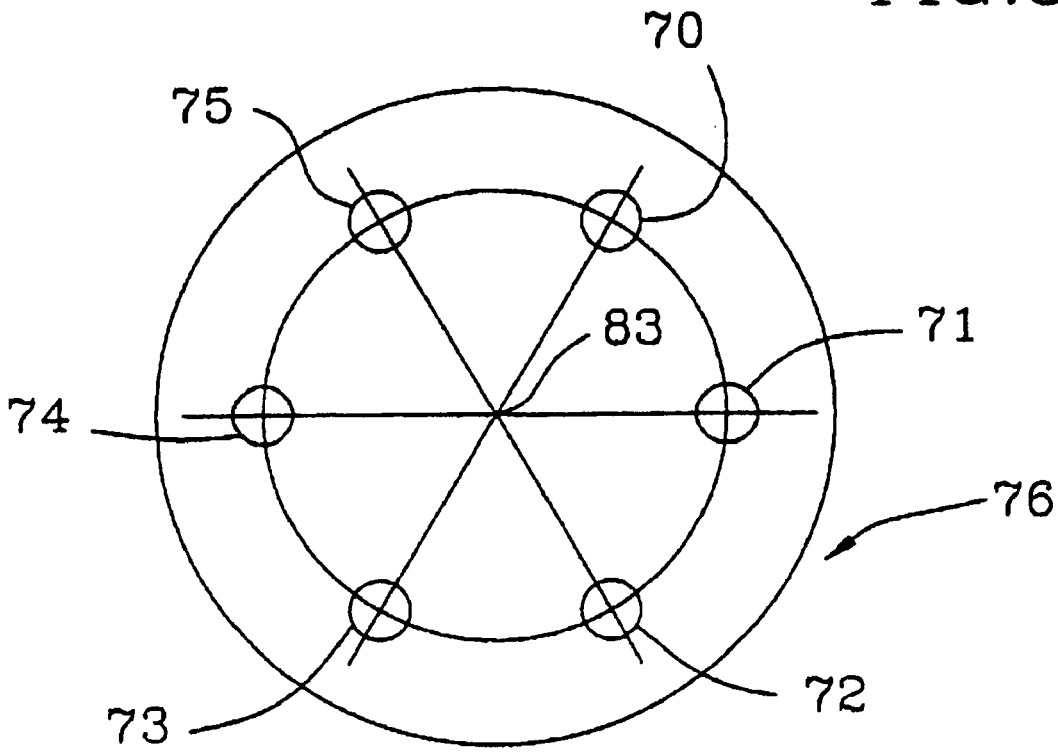
FIG. 3 shows the valve port geometry for the second distributor valve of the apparatus of FIG. 1.
Figure 3:
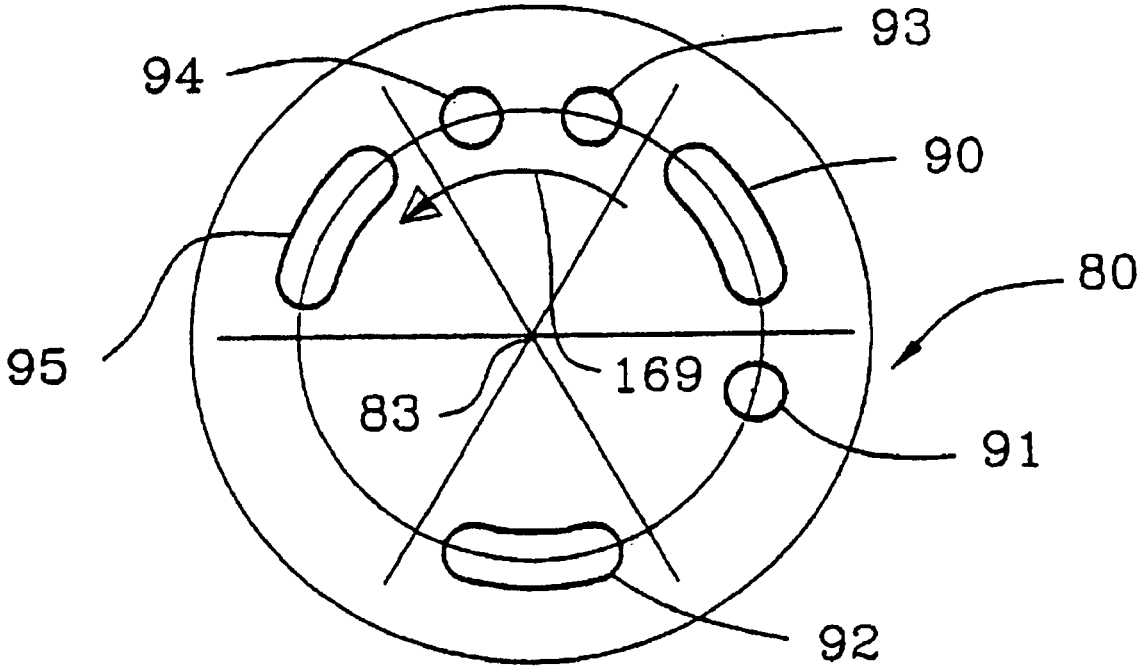

As FIG. 1 is a schematic diagram of the apparatus, all of the bed ports and function ports of the first and second distributor valves are shown on the valve surfaces in FIG. 1 so that all connections to the ports may be shown. Hence, FIG. 1 does not indicate the actual geometric arrangement and timing sequence of the ports which are shown in FIGS. 2 and 3. As will be evident from FIGS. 2 and 3, the bed and function ports in each distributor valve will be located at a fixed radius from the axis of rotation.

While valve surfaces 45 and 85 are depicted as flat discs, they could be cones, cylinders, or other surface of revolution. While flat disc valves are preferred for smaller units because leakage is readily minimized, cylindrical barrel valves may be preferred for much larger units in order to avoid excessively large valve rotor diameter and friction. The respective materials for the mating surfaces of the stator and rotor in sliding contact on the valve surface may include ceramic or hardened metal alloy for one valve element, and carbon or a self-lubricating polymeric compound (for example based on PTFE) for the other element, so as to minimize friction and wear.

The first and second distributor valves are provided with loading means to ensure sealing contact of the rotor and stator on the valve surface. Such loading means may include mechanical springs 100 and 101, respectively loading rotors 40 and 80 by thrust washers 102 and 103.

The loading means may also include gas pressure loading, applied either externally or else internally as here depicted. In the second distributor valve 77, rotary seals 105 and 106 between rotor 80 and stator housing 78 are provided with different diameters, defining annular chamber 107 in the housing. Chamber 107 communicates in rotor 80 with light reflux withdrawal port 90, and in stator housing 78 with surge chamber 108. Chamber 109 in the housing is defined externally of rotary seal 106, and communicates in rotor 80 with light reflux return port 95 and in stator housing 78 with surge chamber 110.

In the first distributor valve 37, rotary seals 112 and 113 between rotor 40 and stator housing 38 define an outer sealing diameter. The rotor and housing are stepped down to a smaller sealing diameter for rotary seals 114 and 115, in turn larger in diameter than rotary shaft seal 116. The diameter difference between rotary seals 113 and 114 defines annular chamber 120 between the rotor and housing. Chamber 120 communicates in rotor 40 with purge exhaust port 52, and in stator housing 38 with purge exhaust conduit 121. The diameter difference between rotary seals 115 and 116 defines annular chamber 125 between the rotor and housing. Chamber 125 communicates in rotor 40 with feed port 50, and in stator housing 38 with feed supply conduit 126 through transfer chamber 127 defined by rotary seals 114 and 115.

Seals 112 and 113 between rotor 40 and housing 38 define annular transfer chamber 130, communicating in the rotor to countercurrent blowdown port 51 and in the housing by countercurrent blowdown conduit 131 to countercurrent blowdown flow control valve 132, communicating with purge exhaust conduit 121 to exhaust conduit 133.

Optionally, a heavy reflux portion of the gas enriched in the first component from preferably the purge exhaust conduit may be recompressed by heavy reflux compressor 135 to the feed supply conduit 126. A three-way feed selector valve 136 is provided to accept gas alternatingly from heavy reflux compressor 135 via conduit 137 and from feed conduit 138, and to deliver this gas to feed supply conduit 126. Feed gas mixture enters the apparatus by infeed conduit 139 to feed compressor 140, and thence by conduit 138 to feed selector valve 136. Surge chambers between the selector valve 136, and compressors 135 and 140, may be needed to absorb flow pulsations as the selector valve is actuated.

An alternative configuration is to install a combined feed compressor 141 (shown in dashed outline) in feed supply conduit 126, downstream of feed selector valve 136. The combined feed compressor compresses the combination of feed and heavy reflux gases, received as a substantially steady gas flow from feed selector valve 136, alternatingly feed gas received from conduit 138 and heavy reflux gas received from conduit 137. If the exhaust pressure in conduit 133 is less than the feed pressure in conduit 139, feed compressor 140 may be eliminated while heavy reflux compressor 135 would be retained. If the exhaust pressure in conduit 133 is substantially equal to the feed pressure in conduit 139, feed compressor 140 and heavy reflux compressor 135 may both be eliminated, so that combined feed compressor 141 performs the combined duties of feed and heavy reflux compression.

The purpose of heavy reflux is to increase recovery of the second component in the light product, or equivalently to increase concentration of the first component in the heavy product discharged from exhaust conduit 133. In the option that heavy reflux is not used, compressor 135 and selector valve 136 would be eliminated so that feed gas from compressor 140 enters feed supply conduit 126 directly.

Infeed conduit 139 and feed compressor 140 (or alternative feed compressor 141) are feed supply means to the apparatus. If the feed compressor was omitted, the feed gas would be supplied by an external source to infeed conduit 139 at approximately the higher working pressure of the process.

It will be evident that transfer chambers 127, 130 and 120 serve respectively to transfer gas from the first function ports 50, 51 and 52 to corresponding function conduits in the first valve stator housing.

A product delivery check valve is provided for each adsorbent bed, communicating from the second end of that bed to a light product manifold. Product gas enriched in the second component is withdrawn from the second ends of the adsorbent beds by light product delivery valve means, here provided as product delivery check valves 144, 145, 146, 147, 148 and 149 delivery light product gas from beds 2, 3, 4, 5, 6 and 7 to light product manifold 150 and light product pressure and/or flow regulation means 151. It may be noted that the light product gas and the light reflux gas may not be identical in composition, as the light product gas will preferably be more highly enriched or purified in the second component.

The rotary distributor valve drive means 41 and 81 are synchronized. Thus, drive means 41 and 81 may be gear reducers, driven by synchronizing drive linkages 152 and 153, which in turn may be driven by a variable speed drive 154 and motor 155. Drive linkages 152 and 153 may use line shafts or chain drives. Actuation means 160 for feed selector valve 136 may cooperate with first valve drive means 41 through synchronizing timing control 161. Control 161 and actuator 162 may be provided as a cam drive on shaft 42, cycling selector valve 136 from feed to heavy reflux back to feed six times per revolution of shaft 42.

Control means for the apparatus include a cycle frequency controller 162 controlling the variable speed drive 154, actuator 163 and valve 132 countercurrent blowdown flow control valve 132, and a light reflux flow control which may be light reflux flow control valves 61–66 whose actuation is coordinated by controller 164. A supplementary or alternative light reflux flow control may be provided by adjustable orifices 96–98 in the second distributor valve. Cycle frequency may alternatively be controlled by variable frequency AC or by variable voltage DC control of motor 155, or by any other means to adjust rotary shaft speed.

This apparatus enables the process of the invention to vary cycle frequency, so as to achieve desired purity, recovery and flow rate of the light product gas. Higher flow rates, both of feed and of light product gas, may in general be achieved by operating the apparatus at higher cycle frequency, expressed as valve RPM. Apart from ultimate mechanical limits to higher cycle frequency that may result from considerations of adsorbent bed attrition or rotary valve frictional heating, the highest useful cycle frequency will be determined by mass transfer degradation of adsorbent bed performance, typically controlled by macropore diffusion. Gas separation performance (e.g. ability to achieve target purity and recovery of light product) will be degraded at higher frequencies by mass transfer effects impeding equilibration between the adsorbate and interstitial gas.

When the process is operating in a range of cycle frequencies in which gas separation performance is not greatly degraded by mass transfer effects, the process (operating between given higher and lower pressures) will operate as an escapement to release exhaust gas enriched in the heavy component. When the feed flow (as well as the higher and lower pressures) is held constant, recovery of the light product will then be enhanced by reducing cycle frequency, while light product purity will be degraded if cycle frequency is reduced too much. Conversely, under these conditions of fixed feed flow rate and working pressure range, light product purity will be enhanced at the expense of light product recovery by increasing cycle frequency, before reaching such high cycle frequencies that purity would be degraded by mass transfer limitations. If target purity and recovery cannot be achieved with a given feed flow rate by adjusting cycle frequency, the feed flow rate should be reduced. Owing to mass transfer influences, highest light product purity and recovery will be achievable at lower cycle frequencies and with lower feed flows, resulting in relatively low light product flow rates.

FIGS. 2 and 3

FIG. 2 shows the arrangement of the bed ports on the stator 36 and of the function ports on the rotor 40, in the plane of the valve surface 45. The first bed ports 30–35 and the first function ports 50–52 are located on the valve surface at the same axial and radial position, so that each first function port is opened in sequence to each of the first bed ports as the valve rotates. The bed ports are spaced apart by equal angular separation between adjacent ports, here 60° for six beds.

As shown in FIG. 3, the second bed ports 70–75 on stator 76 and the second function ports 90–95 on rotor 80 are located on the valve surface 85 at the same axial and radial position, so that each second function port is opened in sequence to each of the second bed ports as the valve rotates. The bed ports are spaced apart by equal angular separation between adjacent ports.

The rotors as shown in FIGS. 2 and 3 rotate clockwise over the stators, as indicated by arrows 168 and 169. The rotors are depicted at the same instant of time, or equivalently at the same angular position relative to the bed ports, in FIGS. 2 and 3.

It will be noted that feed port 50 has an overlapping angular position with light reflux withdrawal port 90, while purge exhaust port 52 has an overlapping angular position with light reflux return port 95.

Alternatively, port 50 could be opened earlier than port 90, as shown by broken outline 170 advancing the leading edge of port 50. Earlier opening of port 50 would provide for feed pressurization of an adsorbent bed, in the final interval before port 90 opens. Feed pressurization, in the final stage of pressurization approaching the higher pressure of the cycle, and cooperating with or instead of product pressurization, is recognized in the art as a desirable alternative to pressurization by product alone.

Apparatus 1 operates in a pressure swing adsorption cycle between a higher pressure, here established by feed compressor 140, and a lower pressure established by the exhaust pressure in exhaust conduit 133. In operation of the apparatus 1, the raw feed gas mixture is supplied at substantially the higher pressure to feed port 50, while gas enriched in the first component is withdrawn by conduit 121 and transfer chamber 120 from purge exhaust port 52 at substantially the lower pressure.

Hence annular chamber 125 is pressurized at approximately the higher pressure, and annular chamber 120 is pressurized at approximately the lower pressure, establishing the gas pressure loading of the rotor 40 on stator 36 according to the relative diameters of seals 113, 115 and 116 defining the axially projected annular areas of chambers 120 and 125.

With a desirable low pressure drop due to flow in the adsorbent beds, light reflux withdrawal port 90 which is angularly aligned with feed port 50 will be pressurized to approximately the higher pressure by gas flow through the beds to which ports 50 and 90 are simultaneously open. Similarly, light reflux return port 95 which is angularly aligned with purge exhaust port 52 will be pressurized to approximately the lower pressure by gas flow through the beds to which ports 52 and 95 are simultaneously open.

Hence annular chamber 107 is pressurized at approximately the higher pressure, and annular chamber 109 is pressurized at approximately the lower pressure, establishing the gas pressure loading of the rotor 80 on stator 76 according to the relative diameters of seals 105 and 106 and the diameter of the rotor 80 on the valve surface. These diameters define the axially projected annular areas of chambers 107 and 109.

Figure 4:
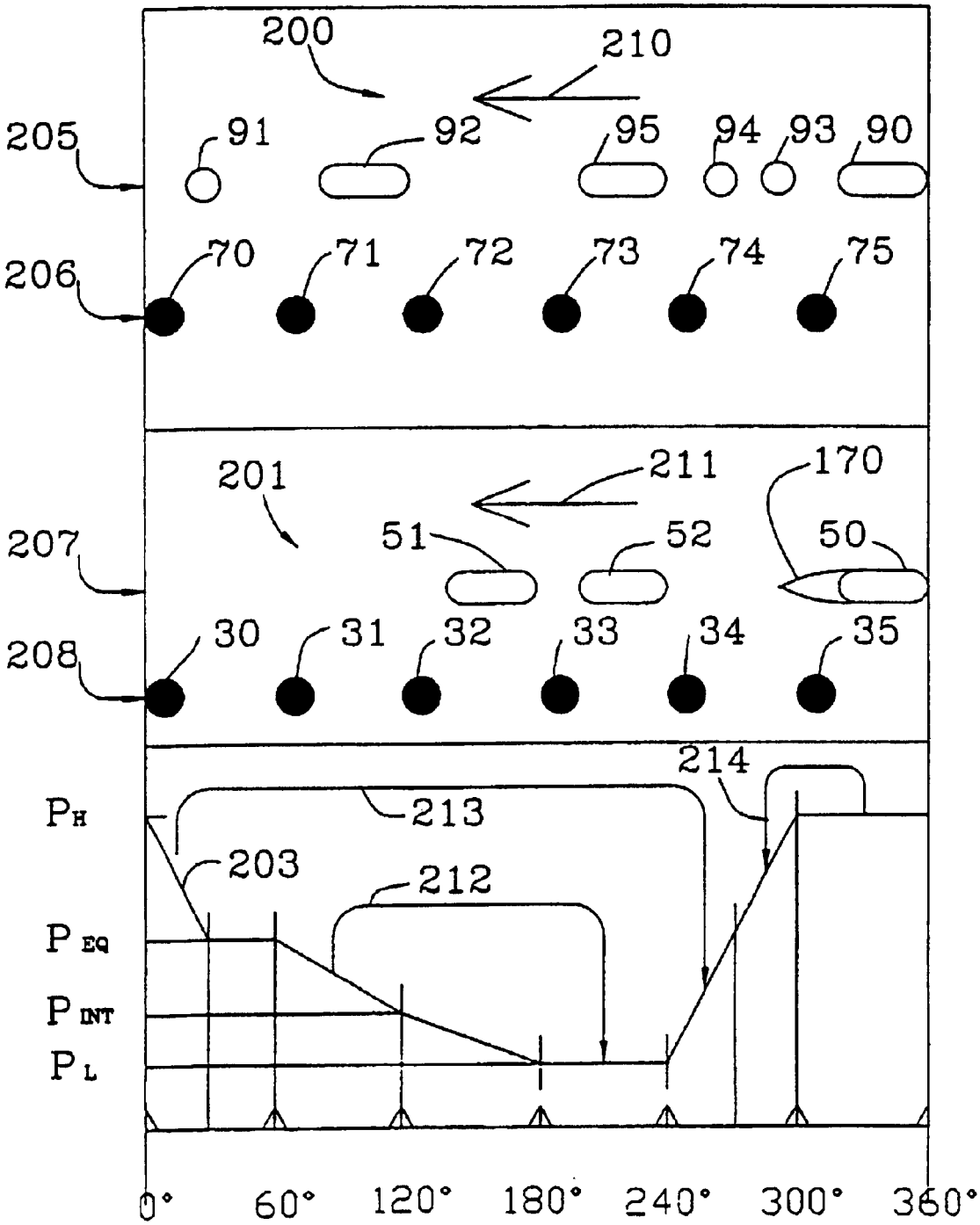
FIG. 4 shows the valve timing and pressure waveform for the apparatus of FIG. 1 with valve port geometry of FIGS. 2 and 3.

The process of the invention may be understood by considering FIGS. 2 and 3 together with FIG. 4.

FIG. 4

Corresponding to the function port geometry of FIGS. 2 and 3, FIG. 4 shows valve timing diagram 200 for the second distributor valve, valve timing diagram 201 for the first distributor valve, and the pressure waveform for typical adsorbent bed 2 communicating to second bed port 70 and first bed port 30.

The angular positions of the ports of the distributor valves are shown in diagram 200 for the second function ports in row 205 and the second bed ports in row 206, and in diagram 201 for the first function ports in row 207 and the first bed ports in row 208. The rotation of the valves causes the rows of function ports 205 and 207 to move leftward in diagrams 200 and 201, for a total movement of 360° in each cycle period T, as shown by arrows 210 and 211.

At the instant of time depicted in FIG. 4, bed 2 has just completed a feed step, in which a flow of the feed gas mixture was supplied at the higher pressure $P_H$ through feed port 50 open to bed port 30 and the first end 8 of the bed 2 during a feed time interval (300° to 360°), while gas enriched in the second component was withdrawn from the second end 14 of the bed. A portion of the gas enriched in the second component was delivered in the feed step as a light product gas by product delivery check valve 144, while the remainder of the gas enriched in the second component was withdrawn as light reflux gas for repressurization through light reflux flow control valve 61, as bed port 70 was open to light reflux withdrawal port 90.

During the feed step, the pressure is maintained at substantially the higher pressure $P_H$. Flow control in the feed may be established by the sum of the feed flow and any heavy reflux flow admitted to transfer chamber 127 and feed port 50 of the first distributor valve, with the light product flow being the excess by mass balance over the exhaust flow enriched in the first component removed from exhaust conduit 133. Heavy reflux flow reduces the quantity of exhaust gas discharged from exhaust conduit 133, increasing concentration of the first component in the exhaust flow and improving recovery of the second component in the light product gas.

Alternatively, the feed supply means may establish the feed pressure at substantially the higher pressure, without directly controlling flow of the feed gas, e.g. in the case that feed compressor 140 is omitted. The flow control during the feed step may then be established by controlling the light product flow, e.g. by the volumetric capacity of light product compressor 151. Usually, the higher pressure $P_H$ of the cycle will be controlled by downstream light product pressure regulation by regulator 151.

If heavy reflux compressor 135 and selector valve 136 are included, a portion of the purge exhaust flow and/or the countercurrent blowdown flow is recompressed as an internally recycled second feed to the apparatus. The heavy reflux gas or second feed is enriched in the first component compared to the feed gas mixture. In order to maintain a desired concentration gradient in the adsorbent bed, with higher concentration of the first component at the first end of the bed and higher concentration of the second component at the second end of the bed, the heavy reflux or second feed (enriched in the second component relative to the feed) should be admitted later in the feed step, after the feed gas has been admitted earlier in the feed step. Hence selector valve 136 would admit the feed gas mixture from feed compressor 140 to feed supply conduit 126 in the first part of the feed step (e.g. 300° to 330°) for bed 2, and would then admit the heavy reflux (or second feed) from heavy reflux compressor 135 to feed supply conduit 126 in the second part of the feed step (e.g. 330° to 360°) for bed 2. The process aspect here is providing a feed selector valve to alternatingly direct the feed gas mixture or the heavy reflux gas through the first distributor valve to the first end of the adsorbent bed, and switching the feed selector valve at a frequency "N" times the cycle frequency for an apparatus of "N" adsorbent beds in parallel.

The above principle of switching in the feed step from a feed gas mixture to a second feed gas of greater concentration in the first component may be generalized in the present invention. Thus, the second feed gas may be provided externally as a gas mixture leaner in a desired second component than the first feed gas hitherto referred to as the feed gas mixture. More than two feed gas mixtures, optionally including a heavy reflux recompressed from the exhaust gas enriched in the first component, may be fed sequentially (in order of ascending concentration in the first component) to the apparatus either through additional feed ports in the first distributor valve or through additional selector valve channels to the feed port.

At the instant depicted in FIG. 4, bed 7 is beginning its feed step and bed 2 is just beginning an equalization depressurization step, in which the first valve is closed to bed 2, while a flow of gas enriched in the second component is withdrawn as light reflux gas from second end 14 through light reflux flow control valve 61, as bed port 70 opens to light reflux withdrawal port 91. This flow depressurizes the adsorbent bed from the higher pressure $P_H$ toward an equalization pressure $P_{EQ}$ less than the higher pressure, while the flow is controlled so that the pressure in the bed approaches the equalization pressure within an equalization time interval (0° to 30°) until port 91 closes to port 70.

There is then a waiting time interval (30° to 60°) until light function port 92 opens to bed port 70, beginning a cocurrent blowdown step. A flow of light reflux gas enriched in the second component is withdrawn from second end 14 through light reflux flow control valve 61, as bed port 70 opens to light reflux withdrawal port 92. This flow depressurizes the adsorbent bed from equalization pressure $P_{EQ}$ to an intermediate pressure $P_{INT}$ greater than the lower pressure $P_L$, while the flow is controlled so that the pressure in the bed approaches intermediate pressure $P_{INT}$ within a cocurrent blowdown time interval (60° to 120°) until port 92 closes to port 70.

The next step is countercurrent blowdown. A flow of gas enriched in the first component is withdrawn from the first end 8 of bed 2 through transfer chamber 130 and countercurrent blowdown flow control valve 132, as first bed port 30 opens to countercurrent blowdown port 51. This flow depressurizes the adsorbent bed from intermediate pressure $P_{INT}$ to the lower pressure $P_L$ while the flow is controlled so that the pressure in the bed approaches lower pressure $P_L$ within a countercurrent blowdown time interval (120° to 180°) until port 51 closes to port 30.

The next step is the purge step, conducted at lower pressure $P_L$ over a purge time interval (180° to 240°). Purge exhaust port 52 opens to first bed port 30, while light reflux return port 95 opens to second bed port 70. A flow of gas enriched in the first component is withdrawn from the first end 8 of bed 2 through ports 30 and 52 to transfer chamber 120 and exhaust conduit 133, while a light reflux flow of gas is returned to second bed port 70 from light reflux return port 95. This light reflux gas has been throttled from light reflux withdrawal port 92 by adjustable orifice 98, and was received from bed 6 undergoing the cocurrent blowdown step, as indicated by arrow 212. Port 74 of bed 6 is open to light reflux withdrawal port 92 while port 70 of bed 2 is open to light reflux return port 95, communicating through orifice 98. Flow control of light reflux gas exchange between beds 6 and 2 in this step is established by orifice 98 in series with flow control valves 61 and 65.

The next step is the equalization pressurization step, in which the bed 2 is partially repressurized with gas exchanged from another bed 4 undergoing partial depressurization from a higher pressure, over an equalization time interval (240° to 270°) for bed 2. Light reflux return port 94 opens to second bed port 70 to admit a flow of light reflux gas to repressurize bed 2 from lower pressure $P_L$ to approach the equalization pressure $P_{EQ}$. This light reflux gas has been throttled from light reflux withdrawal port 91 by adjustable orifice 97, and was received from bed 4 undergoing the equalization depressurization step, as indicated by arrow 213. Port 72 of bed 4 is open to light reflux withdrawal port 91 while port 70 of bed 2 is open to light reflux return port 94, communicating through orifice 97. Flow control of light reflux gas exchange between beds 4 and 2 in this step is established by orifice 97 in series with flow control valves 61 and 63.

The following step is the pressurization step in which bed 2 is repressurized back to the higher pressure over a repressurization time interval (270° to 300°). Light reflux return port 93 opens to second bed port 70 to admit a flow of light reflux gas to repressurize bed 2 from equalization pressure $P_{EQ}$ to approach the higher pressure $P_H$. This light reflux gas has been throttled from light reflux withdrawal port 90 by adjustable orifice 96 and was received from bed 3 undergoing the feed step, as indicated by arrow 214. Port 71 of bed 3 is open to light reflux withdrawal port 90 while port 70 of bed 2 is open to light reflux return port 93, communicating through orifice 96. Flow control of light reflux gas exchange between beds 3 and 2 in this step is established by orifice 96 in series with flow control valves 61 and 62.

Pressurization to the higher pressure may alternatively be achieved at least in part by earlier opening of feed port 50 (as shown by broken outline 170 advancing the leading edge of port 50) to a bed port 30 in the first distributor valve while bed port 70 of the same adsorbent bed 2 remains closed to light reflux withdrawal port 90 during the repressurization step. The working pressure in bed 2 will then rise until it reaches a pressure established by light product regulation means 151, at which point check valve 144 will open to deliver product.

In each step above, it is necessary to control the flow so as to avoid transient peak flow velocities in the adsorbent bed that would damage the adsorbent by excessively large transient pressure gradients, thus controlling the flow so as to limit the ratio of the peak flow velocity to the average flow velocity exiting the second end of the adsorbent bed in that time interval so as to avoid damaging the adsorbent.

An advantage to the distributor valve timing described in FIGS. 2, 3 and 4 is that the light reflux exchanged between pairs of the six beds is always exchanged directly through an adjustable orifice communicating in the rotor between a light reflux withdrawal port open to one bed and a light reflux return port simultaneously open to another bed. This valve timing has the disadvantage of a waiting period of 60° between the equalization depressurization step and the cocurrent blowdown step. Duration expressed as angular rotation of the light reflux steps in the diagram of FIG. 4 are 30° for equalization (depressurization and repressurization), 60° for cocurrent blowdown and purge, and 30° for repressurization. The unequal duration of these steps requires unequal setting of the adjustable orifices 97 and 98 relative to orifice 96, as will be explained in the discussion below of FIG. 7.

FIG. 5

Figure 5:
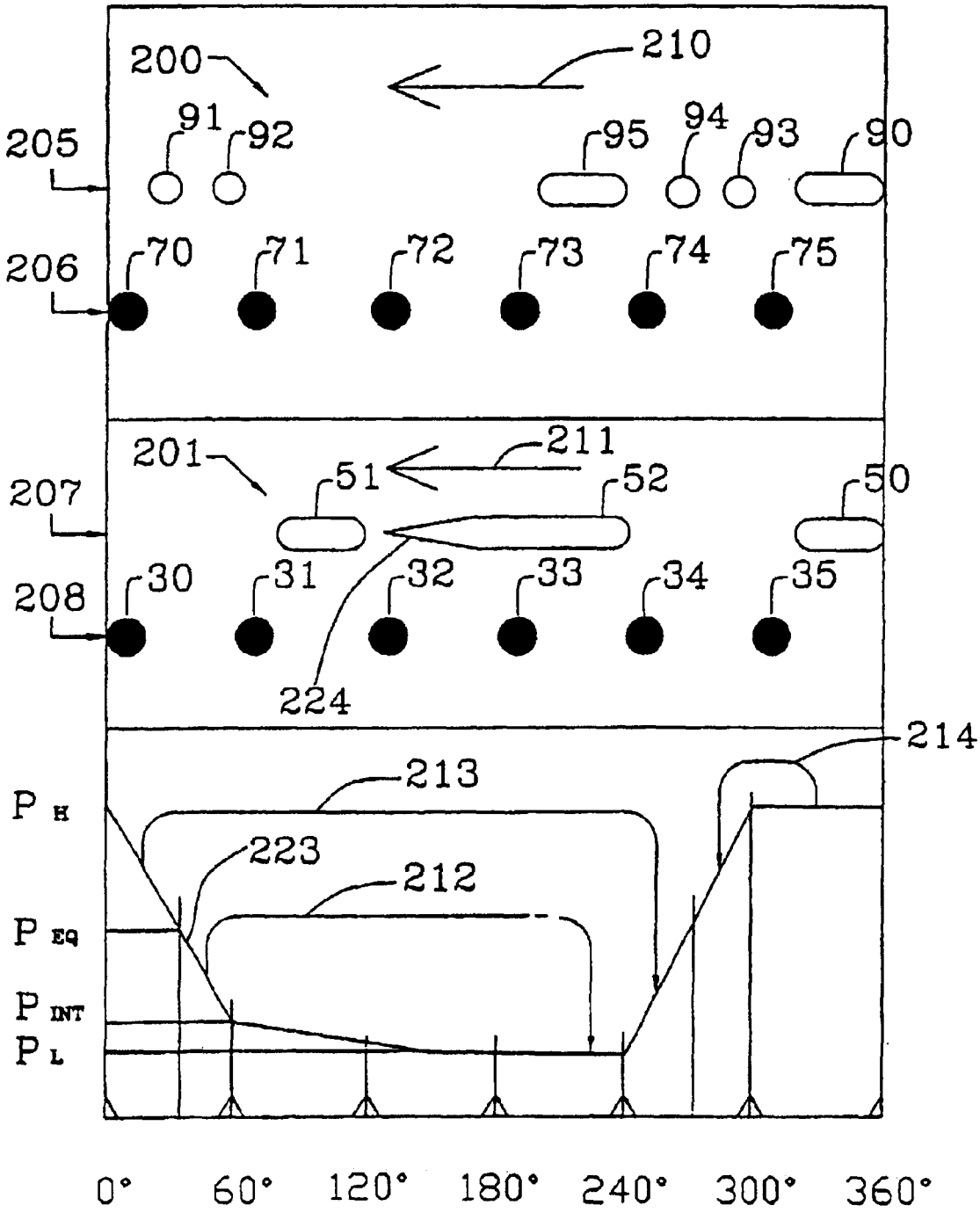
FIGS. 5 and 6 show modified valve timing and pressure waveforms for the apparatus of FIG. 1.

FIG. 5 illustrates a modified timing diagram applicable to apparatus 1, in which the waiting period is eliminated in modified pressure waveform 223. This is achieved by spacing the function ports as shown in FIG. 5. The cocurrent blowdown step is shifted to the interval 30° to 60°, and thus contracted to an angular duration of 30°, equal to the duration of the equalization step and the repressurization step. The countercurrent blowdown interval now spans the interval from 60° to 120°, while an extended purge step spans the interval from 120° to 240°. Since this purge step is longer than needed, the cycle is improved by terminating the countercurrent blowdown at 120° before the pressure has dropped to $P_L$, and then completing the depressurization in the early part of the purge exhaust interval. This is achieved by shaping purge exhaust port 52 to have a tapered leading edge 224 which opens to first bed port 30 before light reflux return port 95 opens to second bed port 70 of bed 2. Also, countercurrent blowdown flow control valve 132 would be partially closed to restrict the countercurrent blowdown flow so that depressurization is incomplete in the countercurrent blowdown step.

The extended countercurrent blowdown and purge steps enable some improvement of cycle performance. However, the open interval of 30° for light reflux withdrawal port 92 is no longer identical to the open interval of approximately 60° for corresponding light reflux return port 95. Hence, surge chamber 110 must be considerably enlarged to accept cocurrent blowdown gas from port 92 after throttling through orifice 98, and then deliver that gas at substantially the lower pressure to light reflux port 95 for the purge step, without excessive pulsations of flow or pressure.

FIG. 6

Figure 6:
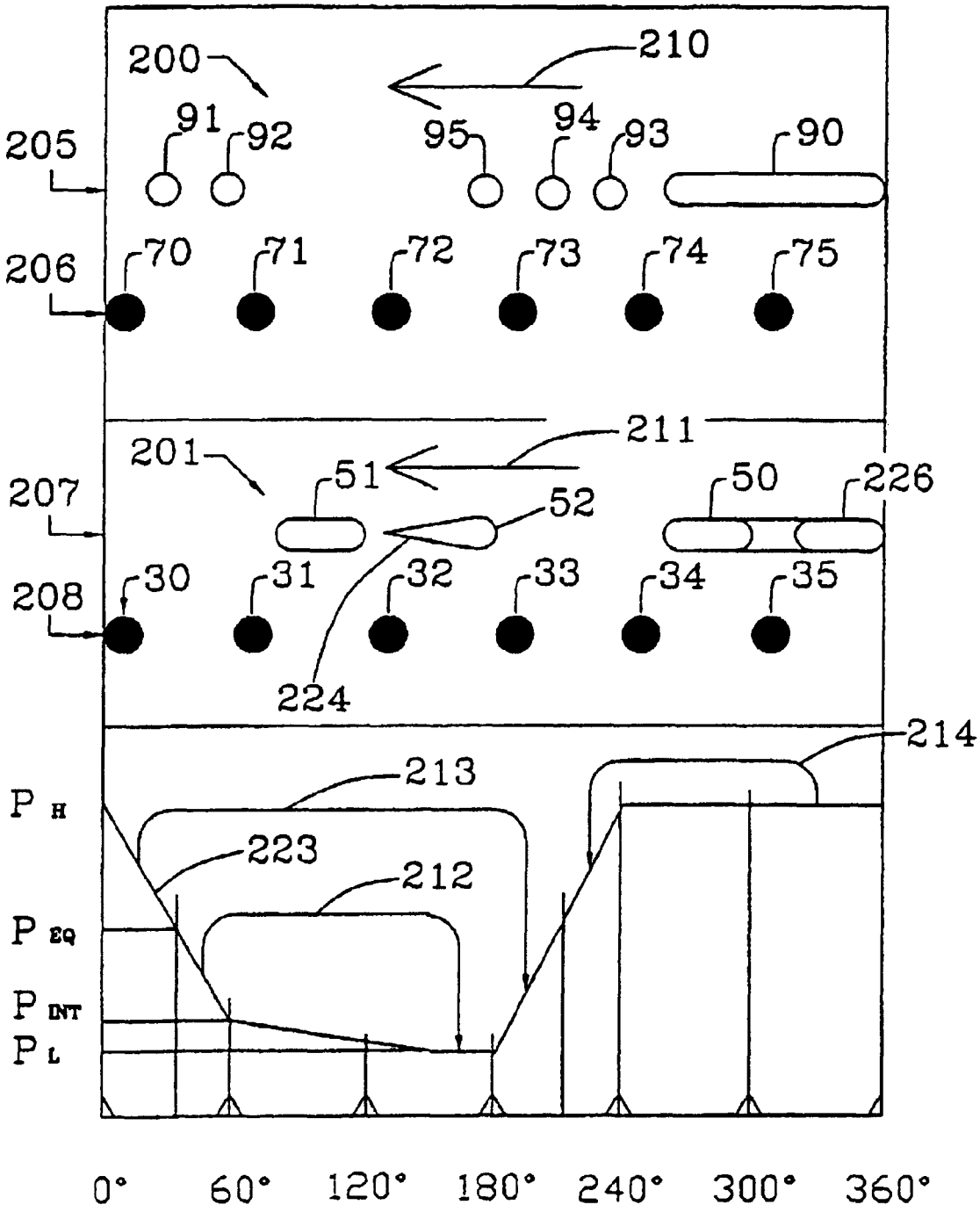

FIG. 6 illustrates a six bed cycle similar to that of FIG. 5, with a double feed step rather than a double exhaust step. A second feed port 226 provides for admission of a second feed in a second feed step, which may be heavy reflux or another gas enriched in the first component relative to the first feed gas mixture which is admitted in the first feed step.

If a single feed gas only is admitted to the apparatus, and there is no heavy reflux, the second feed port 226 may be extended to merge with feed port 90, as indicated by dashed lines in FIG. 6. In that event, the advantage of having a feed step of double length is to reduce flow velocities during the feed step, so that upward gas flow velocities in the adsorbent bed are minimized during the feed step, so as to avoid any approach to bed fluidization that would cause adsorbent attrition. Since upward flow velocities are reduced, the cycle of FIG. 6 may be operated at higher cycle frequency while avoiding risks of bed attrition.

It will be evident that the cycles of FIGS. 5 and 6 could be modified by using only five beds, with a single feed step and a single exhaust step. Conversely, cycles with more than six beds could be used to enable extended feed and/or exhaust steps, or to introduce additional equalization steps.

The cyles of FIGS. 5 and 6 have the advantage that all light reflux steps have the same duration, which simplifies control as will next be shown.

FIG. 7

Control of the process is now discussed. It is highly desirable that the process be capable of adjusting to changes of feed pressure, feed composition, and product demand. A preferred application of the invention is recovery of hydrogen from refinery waste gases, where wide variations of feed pressure and composition, and of demand for purified product, may be normally expected.

Where feed composition is constant, as in the application of oxygen separation from air, a capability for efficient turndown during intervals of reduced product demand will often be required. The most efficient turndown will be achieved by operating the process at reduced cycle frequency and reduced feed flow during intervals of reduced product delivery, so that power consumption can be reduced, while operating stresses and wear of valve components and the adsorbent are also reduced.

While the distributor valves establish the timing logic and sequence of the cycle steps, the invention also provides flow controls for the steps of the process.

These flow controls establish the correct pressure response of the adsorbent beds during depressurization and repressurization steps. It is particularly important that light reflux steps be correctly controlled.

Figure 7:
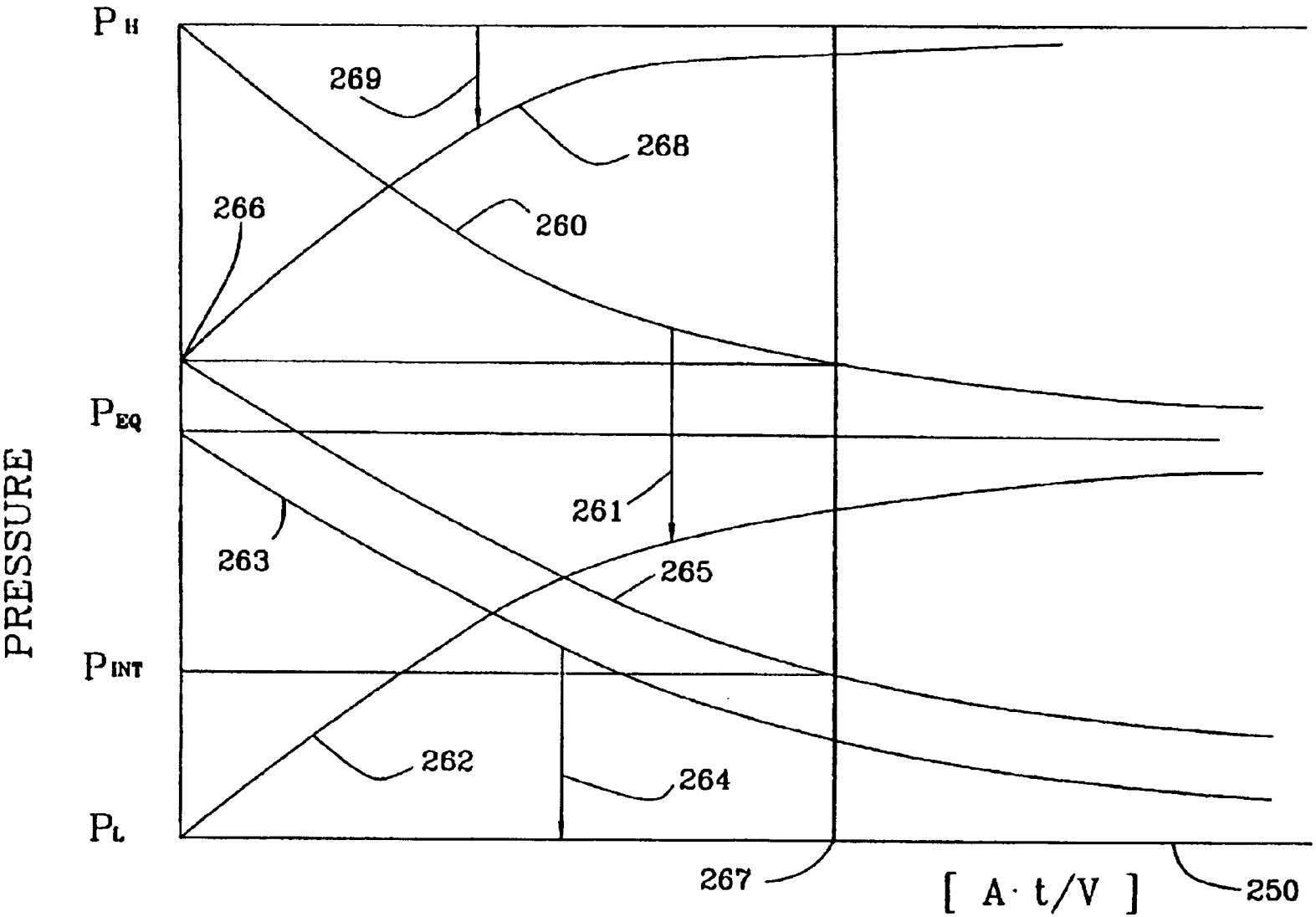
FIG. 7 shows idealized pressure transients for the apparatus with a single pressure equalization step.

FIG. 7 shows calculated pressure transients through the second distributor valve for the equalization, cocurrent blowdown and repressurization steps (the "light reflux" steps) of the process with a single equalization step. The transients are plotted as pressure in an adsorbent bed undergoing each step, versus a time function "(A.t)/V" plotted on ordinate 250 from the beginning of that step. In the time function, "A" is the flow area of an orifice (one of orifices 96, 97, or 98) in the second distributor valve rotor through which flow is occurring to achieve that step, "t" is the time from the beginning of that step when the function ports communicating to that orifice open to the bed ports of the beds undergoing that step, and "V" is the volume of that bed. Flow control of any of these light reflux steps may be obtained by adjusting the area "A" of the corresponding orifice.

The pressure transients were calculated on the basis of the following assumptions. The light reflux gas is a pure second component which is a diatomic gas such as hydrogen, only weakly adsorbed with a linear isotherm and negligible heat of adsorption so the second end of the adsorbent bed remains isothermal. Flow controls 61–66 are assumed to be wide open, corresponding to the process condition of operation at maximum cycle frequency. Pressure drops in the flow path within beds 2–7 are neglected. Pressure drop associated with incomplete opening of the ports in second valve surface 85 is also neglected, equivalent to the assumption (approximately valid for small units with small diameter bed ports) that these ports are opened instantaneously at the beginning of each of the steps considered. The pressure drop associated with gas exchange flows between adsorbent beds was calculated on the basis of adiabatic compressible flow of a diatomic gas, for the case of the PSA cycle pressure ratio $P_H$:$P_L$ assumed as 4:1.

Curve 260 shows equalization depressurization of a bed, exchanging gas as indicated by arrow 261 through orifice 97 to another bed whose equilization pressurization response is shown by curve 262. Curve 263 shows cocurrent blowdown of a bed releasing gas as shown by arrow 264 to a bed undergoing the purge step. Curve 265 shows displacement of the cocurrent blowdown, by starting from a pressure 266 somewhat higher than PEQ as the result of terminating the equalization depressurization step at a value of the time coefficient 267. Curve 268 shows the repressurization step of a bed, receiving light reflux gas as indicated by arrow 269 from a bed undergoing the feed step.

In the case that the cocurrent blowdown for a bed is also terminated at a time corresponding to value 267 of the time coefficient (with assumed instantaneous closing of the valve ports in the valve surface 85), the pressure in that bed has dropped to $P_{IN}$.

For the example of oxygen separation from air over zeolites preferentially adsorbing nitrogen as the second component, computer modelling and experimental testing of the six bed PSA cycle defined by FIG. 4 has shown that an optimum amount of countercurrent blowdown is established when the intermediate pressure is in the range defined approximately by $$(P_{INT}-P_L)/(P_H-P_L)=0.20 \text{ to } 0.25.$$

This optimal ratio would take lower values of $$(P_{INT}-P_L)/(P_H-P_L)=0.15 \text{ to } 0.20$$

when the first component is more strongly adsorbed than nitrogen, as the case of hydrogen purification from a $H_2/CO_2$ mixture, with carbon dioxide the strongly adsorbed second component.

It will be seen from FIG. 7 that $(P_{INT}-P_L)/(P_H-P_L)=0.2$ at the value 267 of the time function, at which point the equalization and depressurization steps are each about 95% complete in approaching the terminal pressure of that step.

For identical step time intervals "t" of these steps, as is obtained with the cycle timing of FIGS. 5 and 6 (and also the timing of FIG. 9, but not for the timing of FIG. 4), the orifice areas "A" of orifices 96–98 should therefore be approximately equal. For FIGS. 5 and 6, it may be noted for each of the light reflux steps nominally $$t=T/12,$$

since the step angular interval is 30°. The pressure drop resistance of each of the three light reflux steps should be substantially equal for the cycle of FIGS. 5 and 6 so that the desirable pressure transient curves of FIG. 7 will be attained with a nominal step time interval defined by time 267. Furthermore, equal adjustment of flow control valves 61–66 will not significantly upset the balance of pressure changes between the cocurrent and countercurrent blowdown steps in FIGS. 5 and 6.

Hence, the orifices 96–98 (once adjusted to approximately an equal effective area "A") need not be further adjustable for the cycles of FIGS. 5 or 6, since flow control of light reflux steps can be provided by coordinated actuation of valves 61–66.

An important process embodiment of the present invention is thus to establish equal time intervals for each of the light reflux steps (equalization, cocurrent blowdown to purge, and product repressurization) by the porting of the second distributor valve, and then to provide coordinated actuation of flow controls (e.g. valves 61 to 66) between the second end of each bed and the second distributor valve, so as to achieve at any operating cycle frequency of the process substantial completion of the pressure equalization step while avoiding excessively rapid rate of pressure change, and while maintaining the ratio $$0.1<(P_{INT}-P_L)/(P_H-P_L)<0.3, \text{ or preferably}$$

$$0.15<(P_{INT}-P_L)/(P_H-P_L)<0.25.$$

With flow control valves 61–66 fully open, and orifices 96–98 also open with flow area "A", the cycle of FIG. 5 can be operated at maximum cycle frequency for the given pressure ratio $P_H/P_L$ to achieve pressure transient curves for the light reflux steps similar to FIG. 6. The cycle cannot be operated at higher frequency, except by lowering the pressure ratio $P_H/P_L$.

If the cycles of FIG. 5 or 6 are operated at lower frequency at the same pressure ratio PH/PL, the effective orifice flow area "A" must be adjusted in substantially inverse ratio to the step time interval "t" or cycle period "T", so that the step time coefficient 267 is approximately constant. If the cycle period were increased by e.g. a factor of two without adjusting the effective "A" by a factor of ½, the cocurrent blowdown would be continued too far so $P_{INT}$ would be much too low and the countercurrent blowdown step would be nearly eliminated, resulting in loss of purification and recovery performance for the light product.

Since the cycles of FIGS. 5 and 6 operate well with equal "A" for each light reflux step, it is immaterial to performance whether the effective "A" is controlled by adjusting the orifices 96–98 or the flow controls 61–66. In practice, the orifices 96–98 on the rotor within the second distributor valve are less conveniently controlled operationally, so flow controls 61–66 have been provided for more convenient operator control access. For these cycles, operational adjustability of orifices 96–98 may not be required, once the apparatus has been assembled with correct adjustments for a given application.

In the cycle of FIG. 4, the light reflux steps have unequal time intervals. The duration of the cocurrent blowdown step is twice as long (T/6) as the duration of the equalization and repressurization steps. Therefore, orifice 98 throttling the countercurrent blowdown step should have an effective flow area "A" (after lumped inclusion of other pressure drops between the second ends of beds exchanging gas in light reflux steps in the effective orifice area) only half the effective orifice flow area associated with orifices 97 and 96 throttling the equalization and repressurization steps respectively.

When the light reflux orifices are to be used for flow adjustment, it may be noted that the most critical adjustment is that of orifice 98 controlled countercurrent blowdown flow because maladjustment of that orifice for any operating cycle frequency will upset the desirable value of $P_{INT}$, so that the countercurrent blowdown may be too large or too small. If $P_{INT}$ is too high because orifice 98 is too restrictive, the countercurrent blowdown will be relatively large while the resulting small cocurrent blowdown will release only a small volume of purge gas. If $P_{INT}$ is too low because orifice 98 is too open, the countercurrent blowdown may be too small, compromising purity.

One simplification within the invention is to use fixed orifices 96 and 97 on the less critical equalization and repressurization steps, while using an adjustable orifice 98 to regulate the more critical countercurrent blowdown. This approach is especially suitable for the cycle of FIG. 4, having a slow countercurrent blowdown which is more sensitive to control as has been verified in experimental prototypes of the invention.

Figure 9:
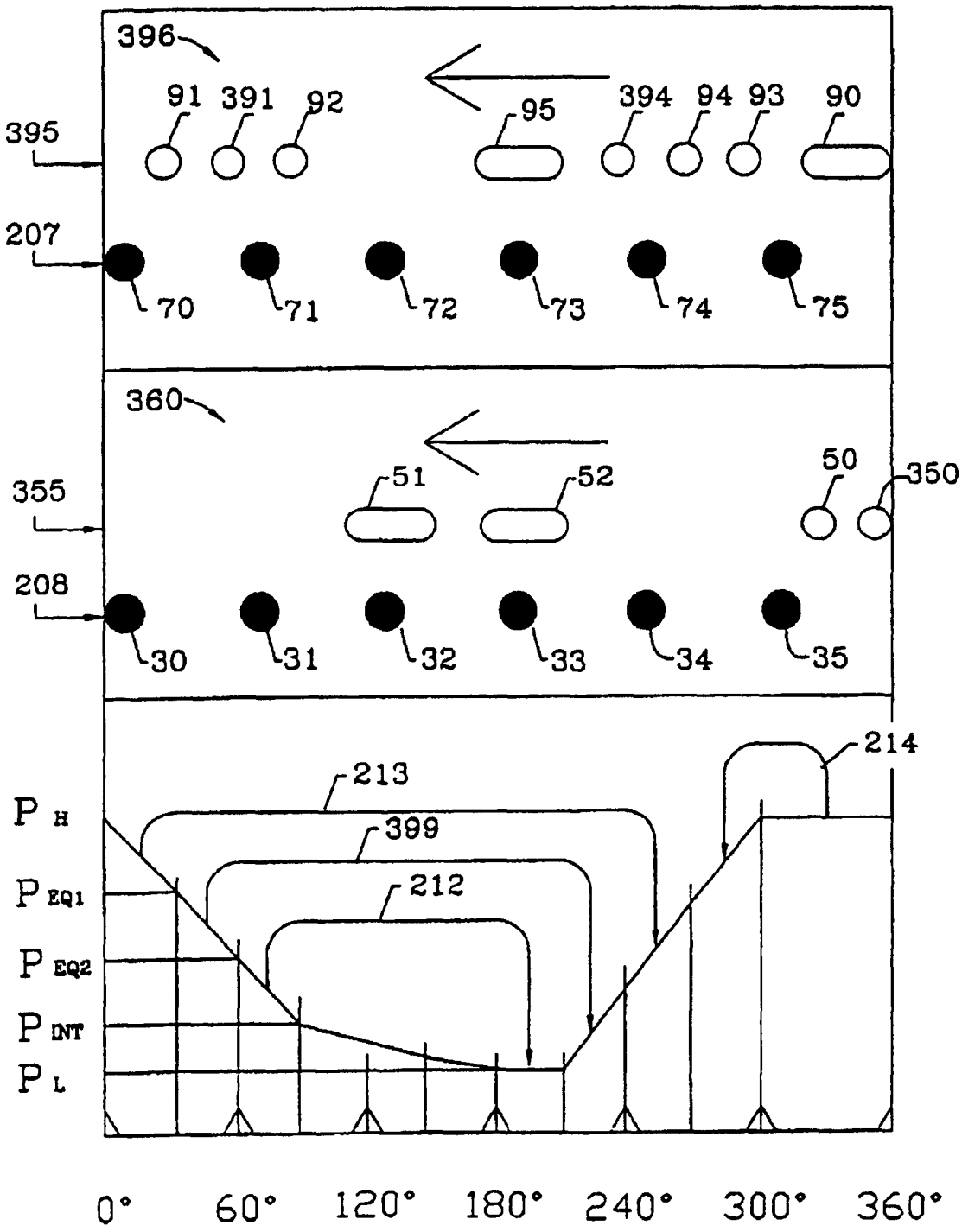
FIG. 9 shows valve timing and the pressure waveform for the apparatus of FIG. 8.

The above discussed control characteristics have been verified experimentally with prototypes, using six beds with valve timing according to FIG. 4 or FIG. 9. It was found that maladjustment of the flow controls could render the process inoperative, while satisfactory performance in hydrogen purification and oxygen concentration applications was demonstrated, with the orifices adjusted for each operating condition to achieve the pressure transients as depicted in FIG. 7.

Figure 8:
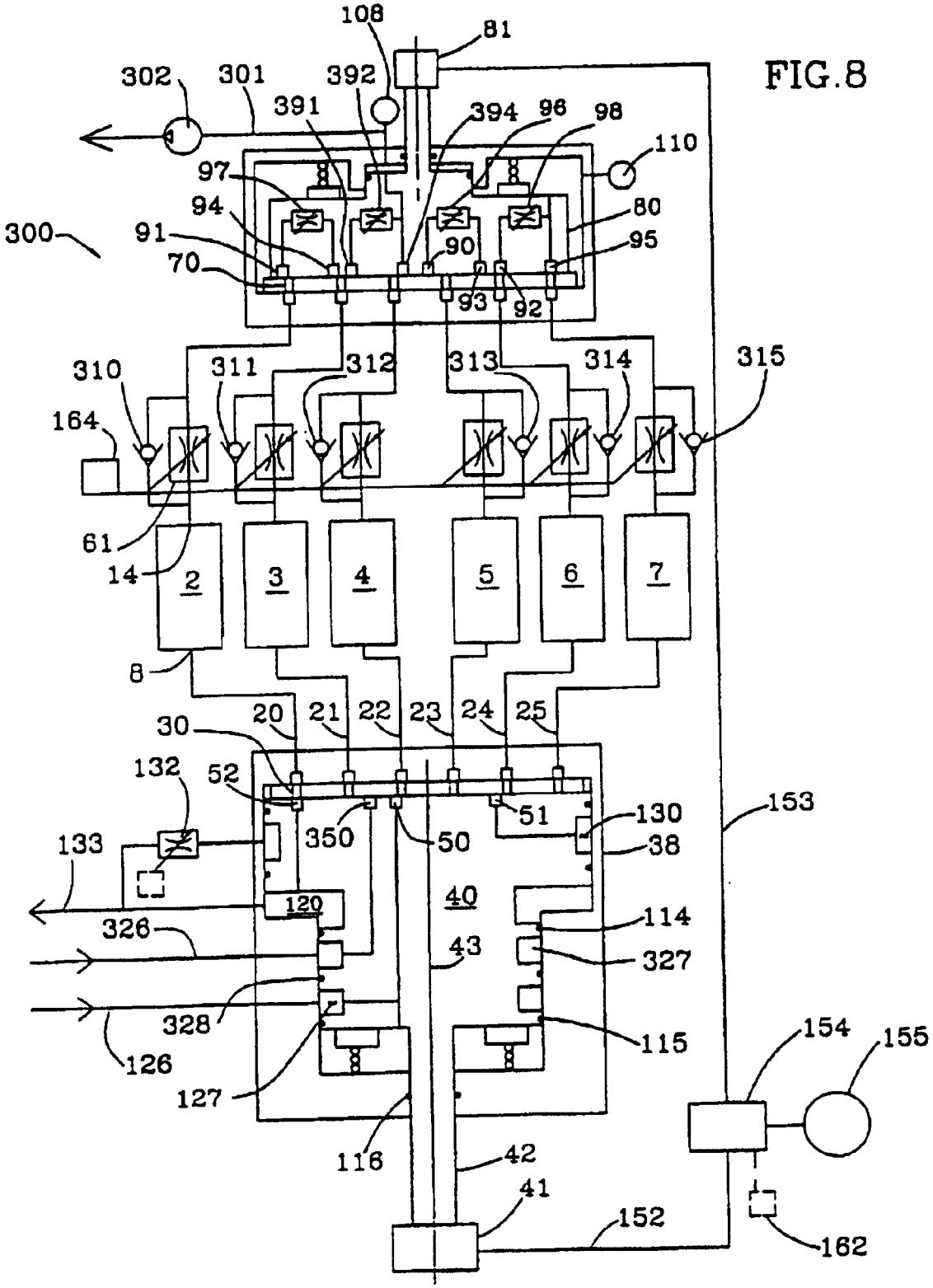
FIG. 8 shows an alternative schematic of a six bed PSA apparatus with provision for two equalization steps.

FIGS. 8 and 9

FIG. 8 shows another embodiment 300 of a six bed PSA apparatus with several alternative features of the invention. Component numbering and nomenclature are similar to FIG. 1, except as noted below. Like FIG. 1, FIG. 8 schematically shows all bed ports and function ports of the first and second distributor valves, and likewise does not show the geometry of the ports relative to the axis of each valve. FIG. 9 shows timing diagrams and the pressure waveform for apparatus 300.

Apparatus 300 is configured to deliver the light product gas through the second distributor valve. Light product gas, enriched in the second component, is delivered by second function port 90, during the feed step of each adsorbent bed, and by light product delivery conduit 301 to optional light product compressor 302. Light product compressor with its downstream load provides means to regulate the pressure and flow of the light product gas. To avoid undesirable pressure reduction below the higher pressure of the light product gas, non-return valves 310–315 are provided in parallel with each of flow control valves 61–66. The non-return valves enable gas enriched in the second component to flow from the adsorbent beds to the second distributor valve with minimal pressure loss, while light reflux gas flowing back from the second distributor valve to the adsorbent beds may be throttled by the flow control valves 61–66.

Apparatus 300 illustrates alternative means of introducing a second feed gas, having a higher concentration in the first component than the feed gas. Instead of an external feed selector valve admitting alternating pulses of the feed and a second feed (or heavy reflux), a second feed supply conduit 326 introduces the second feed directly to second feed transfer chamber 327 between rotor 40 and stator housing 38. Transfer chamber 327 is isolated from feed transfer chamber 127 by rotary seal 328, and communicates to second feed port 350 on valve surface 45. Second feed port 350 follows feed port 50 in the timing sequence of first function ports 355 on first distributor valve timing diagram 360 of FIG. 9. Second feed port 350 corresponds to second feed port 226 in FIG. 6.

The second feed gas is admitted to the adsorbent beds in the latter portion of the feed step, or in a second feed step as provided in FIG. 6, after the admission of the feed gas less concentrated in the first component than the second feed gas. The sequential admission of feed gas increasingly concentrated in the first component helps to provide a rising concentration of the first component toward the first end of the adsorbent beds, and of the second component toward the second end of the adsorbent beds.

The process aspect here is supplying the feed gas mixture during the initial part of high pressure step (A) to the first end of the adsorbent bed, and then supplying a second feed gas with a greater concentration of the first component during the later part of step (A) to the first end of the adsorbent bed.

The second feed gas may be heavy reflux gas diverted from the exhaust gas and recompressed, as discussed for the embodiment of FIG. 1. Alternatively, the second feed gas may be another gas mixture, leaner in the second component than the first feed gas mixture. This principle may readily be generalized to a plurality of feed gases, each admitted in ascending order of concentration in the first component or declining order of concentration in the second component. Thus, in hydrogen recovery from refinery waste gases, there may be a multiplicity of feed gases with differing concentrations of hydrogen as the second component.

Apparatus 300 also includes provision in the second distributor valve for a second equalization step of the process. An additional light reflux withdrawal port 391 is provided, communicating through adjustable orifice 392 in rotor 80 to light reflux return port 394. The timing of ports 391 and 394 is shown in function port sequence 395 of second distributor valve timing diagram 396 of FIG. 9. The second equalization step includes depressurization of one bed from $P_{EQ1}$ to approach $P_{EQ2}$, exchanging light reflux gas as indicated by arrow 399 to another bed being pressurized from $P_L$ to approach $P_{EQ2}$.

FIG. 10

As the adjustable orifices in the rotor of the second distributor valve are enclosed within a rotor and behind both dynamic and static seals, their operational adjustment presents challenges, particularly when the PSA system is purifying dangerous gases such as hydrogen. Hence the invention provides means for their adjustment.

Figure 10:
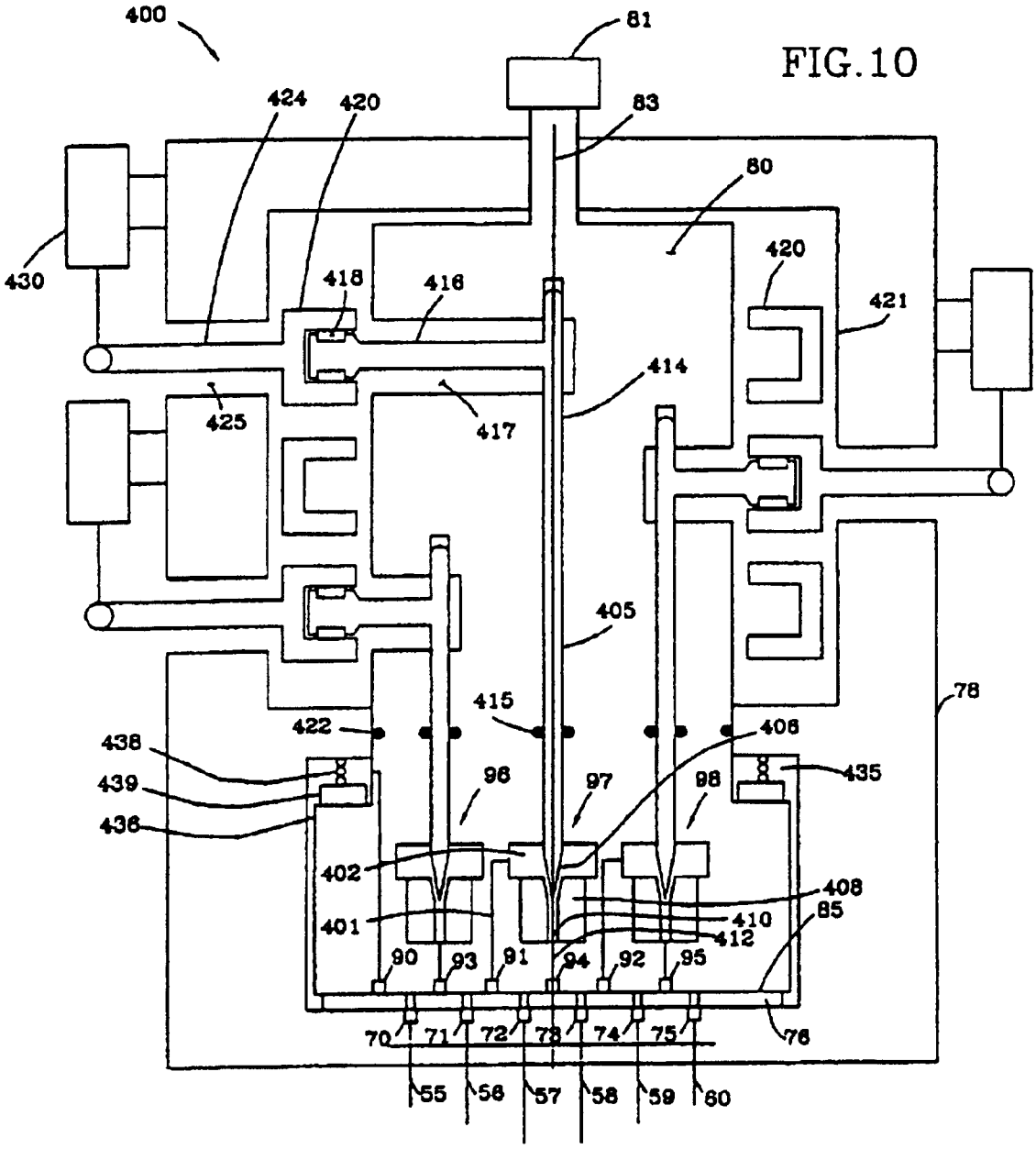
FIG. 10 shows mechanical actuators for the adjustable orifices.
Figure 11:
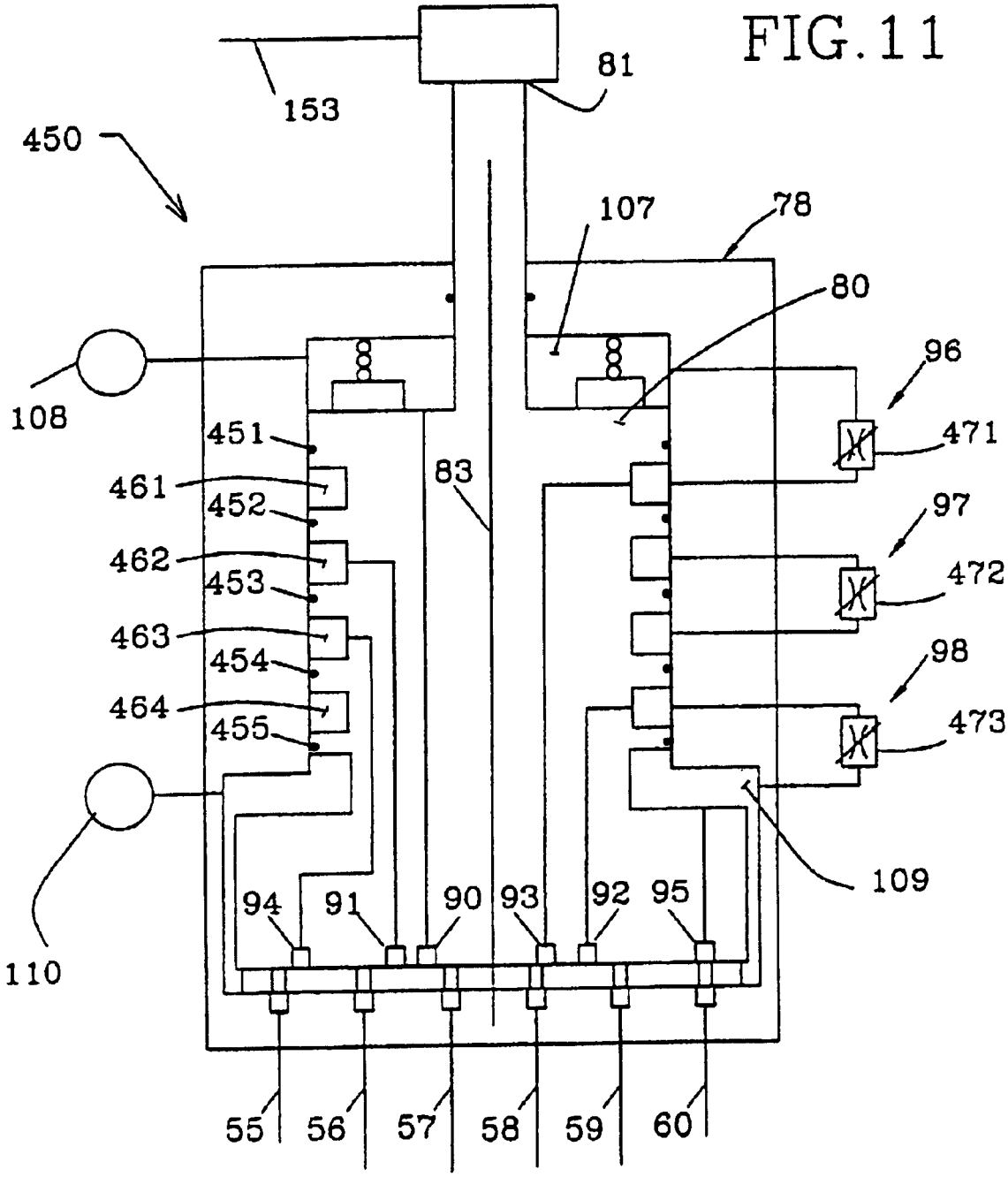
FIG. 11 shows a second distributor valve with fluid transfer chambers through the stator housing to the adjustable orifices.

FIG. 10 is a schematic drawing of an alternative second distributor valve 400 with control means for the adjustable orifices of the rotor as configured for embodiment 1 of FIG. 1. Adjustable orifices 96–98 are provided as throttle valves mounted in rotor 80, each with identical or similar external actuation means, described here in detail for adjustable orifice 97. Light reflux withdrawal port 91 communicates by conduit 401 to upstream valve chamber 402. Chamber 402 is penetrated by valve stem 405 with coaxial needle 406 aligned with valve seat 408. The adjustable throttle valve orifice is defined between needle 406 and seat 408, and provides fluid communication with downstream valve chamber 410 which in turn communicates by conduit 412 to light reflux return port 94.

Drive end 414 of valve stem 405 is isolated from process fluid by seal 415, and is provided with a drive pin 416 penetrating a drive slot 417 in rotor 80. Slot 417 has axial clearance for pin 416, sufficient for movement of stem 405 with needle 406 to adjust the orifice area between the needle and valve seat 408. Drive pin 416 projects clear of rotor 80 to roller 418 on drive pin 416, engaging circumferential thrust collar 420. Thrust collar 420 is slidably mounted for axial motion concentric to axis 83 in stationary guide 421, which is a coaxially concentric extension of stator housing 78 external of rotary seal 422. Actuation pin 424 on thrust collar 420 penetrates slot 425 in guide 421, and is coupled to linear actuator 430. Thus, linear motion of actuation pin 424 by actuator 430 is directly transmitted through thrust collar 420 and drive pin 416 to shift the valve stem.

Rotary seal 422 seals chamber 435 between rotor 80 and stator housing 78. Rotor 80 has a diameter 436 greater than the sealing diameter of rotary seal 422. Chamber 435 communicates with light reflux withdrawal port 90 so as to pressurize chamber 435 to substantially the higher pressure, thus providing gas loading means urging of rotor 80 onto valve surface 85. Mechanical valve loading means may also be provided by spring 438 loading thrust washer 439 onto rotor 80.

FIG. 11

An alternative embodiment 450 of the second distributor valve uses fluid transfer chambers between the rotor 80 and the stator housing 78, so that the adjustable orifices can be provided as throttle valves external to the stator housing.

On a common sealing diameter, rotary seals 451, 452, 453, 454 and 455 mutually isolate chamber 107 communicating in rotor 80 to light reflux withdrawal port 90 at substantially the higher pressure, transfer chamber 461 communicating to light reflux return port 93, transfer chamber 462 communicating to light reflux withdrawal port 91, transfer chamber 463 communicating to light reflux return port 94, transfer chamber 464 communicating to light reflux withdrawal port 92, and chamber 109 communicating to light reflux return port 95 at substantially the lower pressure. Adjustable orifice 96 is provided as throttle valve 471 communicating through stator housing 78 to chambers 107 and 461. Adjustable orifice 97 is provided as throttle valve 472 communicating through stator housing 78 to chambers 462 and 463. Adjustable orifice 98 is provided as throttle valve 473 communicating through stator housing 78 to chambers 464 and 109.

FIG. 12

Several refinements for providing flow control to minimize peak gas flow velocities, or to increase the average flow velocity in each step, are now discussed.

Figure 12:
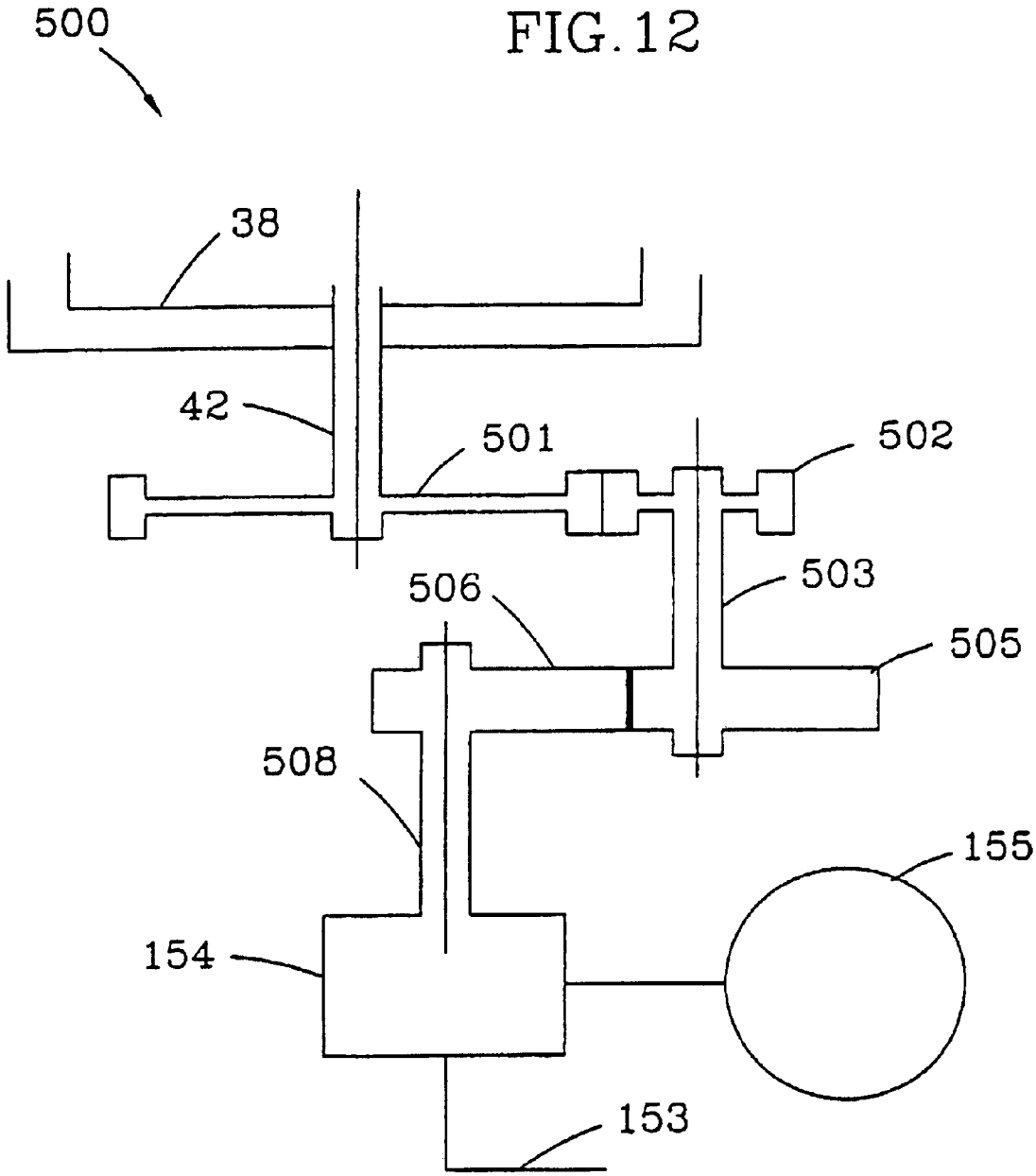
FIG. 12 shows an oscillating angular velocity mechanical drive for the first distributor valve.

One such refinement is to oscillate the angular velocity of the first rotary distributor valve, to extend its open periods. With reference to FIG. 1, FIG. 12 provides an example of first valve drive means 41 and synchronizing linkage 152, here provided as a gear train 500 coupling motor 155 through variable speed drive 154 to shaft 42 turning rotor 40 in stator housing 38. Shaft 42 carries gear 501, driven by pinion 502 on lay shaft 503. The gear reduction ratio from shaft 503 to shaft 42 is 6:1 for the example of a PSA system with six adsorbent beds, or more generally N:1 for N adsorbent beds in parallel. Variable speed drive 154 drives output shaft 508, which is coupled to lay shaft 503 by a pair of noncircular or elliptical gears 505 and 506. Elliptical gears 505 and 506 have the same number of teeth.

By selecting readily available elliptical gears whose maximum pitch radius is twice the minimum pitch radius, constant rotary speed operation of shaft 508 will result in a variation of the instantaneous angular velocity of shaft 503 from half that of shaft 508 to twice that of shaft 508, or over a range of 4:1. Hence the instantaneous angular velocity of first rotary valve shaft 42 will also vary through a 4:1 ratio, with six maxima and six minima per complete revolution.

The apparatus for "N" adsorbent beds in parallel has drive means including angular velocity variation means to vary the angular velocity of the rotor of the first distributor valve at a multiple "N" times the cycle frequency, so as to extend the time interval during which a function port is substantially fully open to each bed port, and to reduce the time interval during which that function port is substantially closed to any bed port, while maintaining the minimum angular velocity of the rotor to be greater than zero throughout the cycle so as to avoid excessive wear due to stopping and restarting rotation. The angular velocity variation means may be provided as a pair of noncircular gears in the drive train to the first distributor valve.

The angular phase of shaft 42 with respect to the angular velocity oscillations generated by the pair of elliptical gears will be set so that the angular velocity of rotor 80 is low while the first bed ports and first function ports are mutually opened, while the angular velocity will be high while the ports are closed and switching. Hence, the time during which the valve ports are nearly fully open will be maximized, while the time during which the valve ports are closed or nearly closed will be minimized. Since the minimum angular velocity of the rotor is well above zero, rapid wear due to stick-slip conditions (that would result from intermittent rotation with intervals of completely stopped rotation) is avoided.

By minimizing the duration of low flow valve switching time intervals, this feature enhances productivity of the adsorbent beds and of the distributor valve. It will be seen that the described gear train is means to vary the angular velocity of the valve rotor, so as to extend the time interval during which a function port is substantially fully open to each bed port, and to reduce the time interval during which that function port is substantially closed to any bed port, while maintaining a finite angular velocity of the rotor throughout the cycle.

It will be evident that other mechanisms could be used to vary the angular velocity of the distributor valve rotor, N times per cycle period, with correct phase to extend the duration of open intervals. This description has focused on the first distributor valve, whose function steps have an angular interval equal to the angular spacing between first bed ports. Oscillating the angular velocity of the second distributor valve is less advantageous, as some of its function steps may have much shorter angular interval than the bed port angular spacing. The first distributor valve typically must carry much larger flows than the second distributor valve, and hence can benefit substantially from the oscillatory angular velocity feature.

A further refinement is to adjust the phase relationship and angular velocity profile, so that the distributor valve opens relatively slowly and closes relatively quickly. This feature will provide increased throttling between partly open ports at the beginning of equalization, blowdown or repressurization steps. At the beginning of those steps, the driving pressure difference is greatest, so increased throttling then can usefully reduce peak velocities.

The principle of asymmetric throttling over the distributor valves, with stronger throttling at the beginning relative to the end of pressurization, equalization and blowdown steps, can also be achieved by shaping the valve ports. Thus, purge exhaust port 52 of FIG. 5 is shown with a narrow tapered leading edge 224, so that bed ports 30–35 will open gradually to port 52 with initially a small open orifice for relatively more intensive throttling, gradually opening to the maximum port orifice, and then after the open interval will close relatively abruptly. It can be seen from FIG. 6 that greater throttling at the early part of each step, progressively opening the valve ports to the fully open orifice area toward the end of the step, will make the flow more uniform through most of the step, except at the extreme beginning and end.

Another desirable refinement in larger scale applications is to make the lands between function ports somewhat narrower than the width of the bed ports, so that flow between the function port and bed ports is never completely closed. With a brief time interval of each function port being slightly open (with substantial throttling) to two beds, cross-port leakage between beds will be small, while flow pulsations and valve opening/closing time intervals will be reduced.

Figure 13:
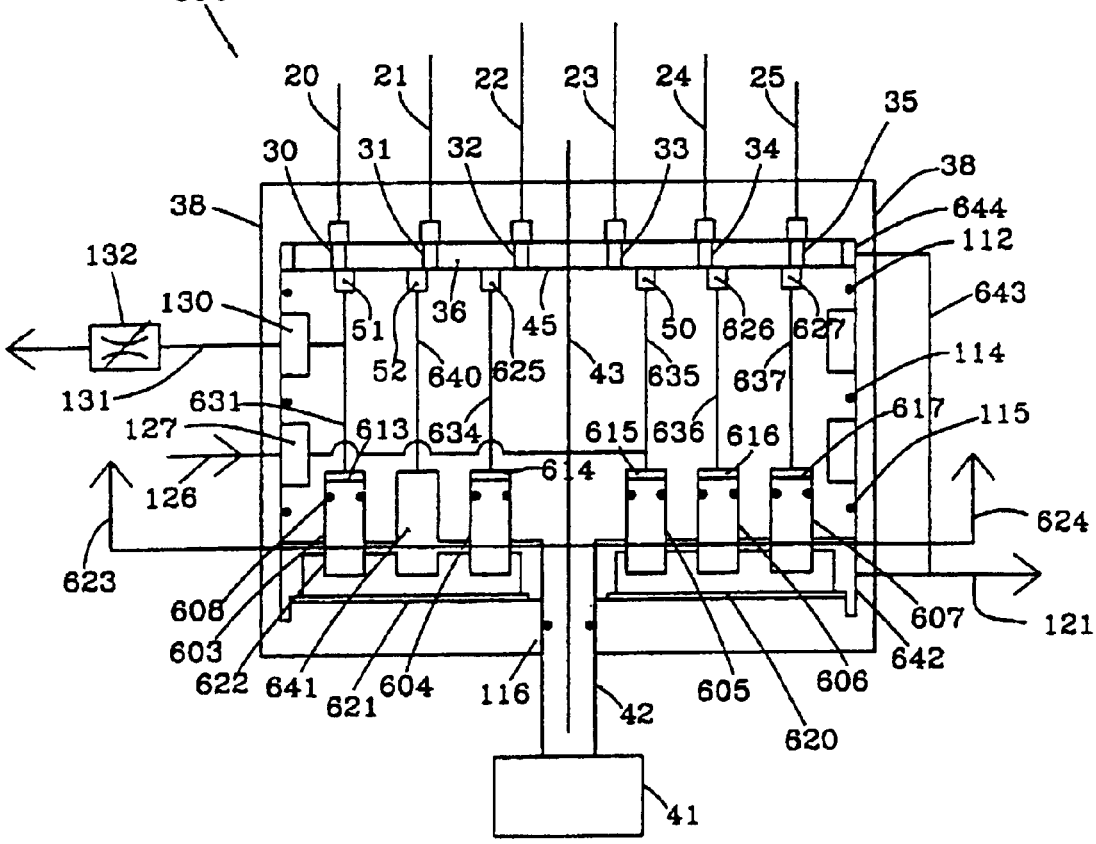
FIG. 13 shows a pressure-balanced embodiment of the first distributor valve.
Figure 14:
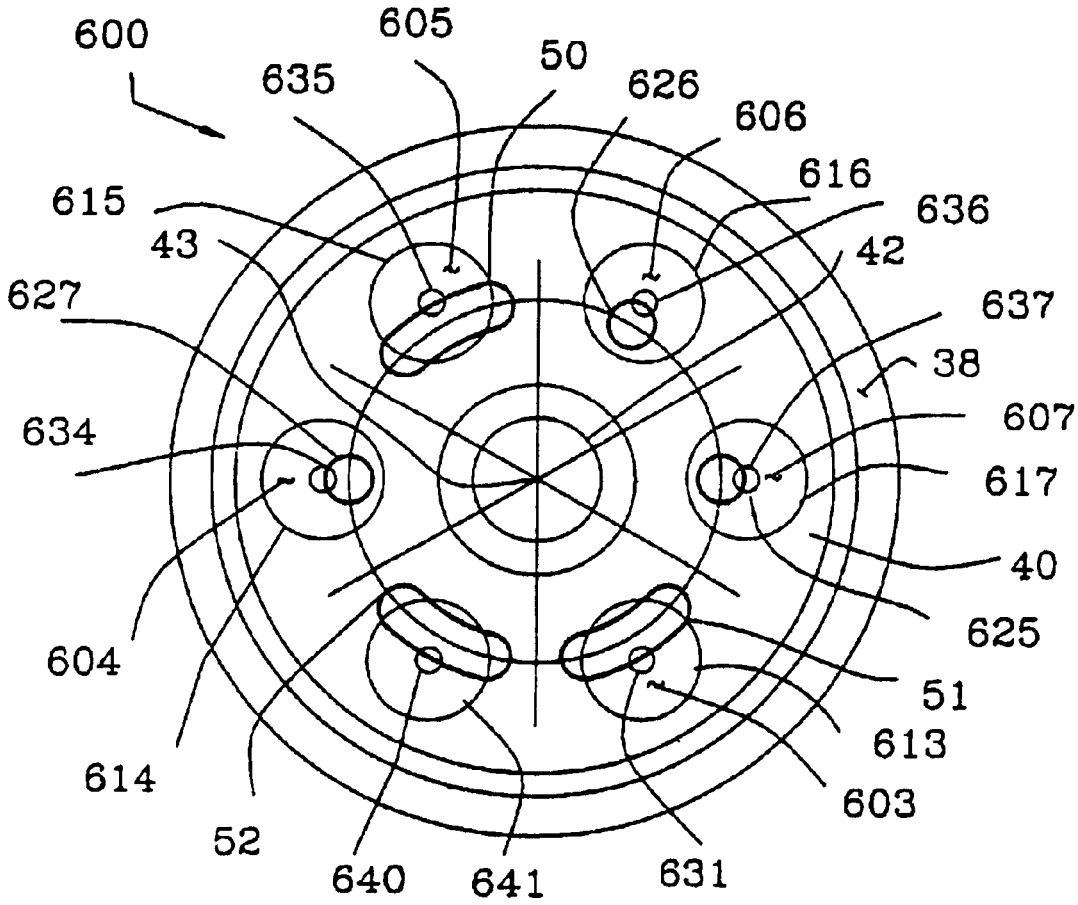
FIG. 14 is an axial section of the valve of FIG. 13.

FIGS. 13 and 14

The rotary distributor valves discussed above have used gas pressure or compression spring (e.g. mechanical spring) loading systems concentric to the valve rotary axis, to ensure close contact between the rotor and stator at the valve surface. When the valve has N bed ports and its function ports spaced over 360°, so that one rotation of the rotor corresponds to one cycle of the process, it is unbalanced (as will be evident from FIGS. 2 and 3) because the higher and lower pressure function ports are on opposed sides of the axis. As a result of the imbalance, high contact pressures will be established between the rotor and the stator adjacent the lower pressure function ports. Radial balance is more important for the first distributor valve, as it is typically larger than the second distributor valve.

FIGS. 13 and 14 show an alternative embodiment 600 of the first distributor valve in which approximate radial balance of the contact pressure distribution on the valve surface 45 is achieved by communicating the pressure distribution on the valve surface to a plurality of axially aligned loading pistons 601–607 disposed in a coaxial annular ring around the axis 43 within the valve rotor at a radius approximately equal to or somewhat greater than the radius of the function ports. Each of the pistons 603–607 is pressurized by the local pressure at its axially projected position on the valve surface (typically corresponding to a function port), and is sealed by a piston ring 608 in a cylinder 613–617 in rotor 40, with each cylinder parallel to axis 43. The loading pistons are reacted on a rotating thrust plate 620, bearing against stationary thrust pad 621 of self-lubricating material. Thrust pad 621 is supported within stator housing 38, normal to the axis of rotation. Each of the loading pistons is located by a thrust socket 622 in thrust plate 620, thus forcing corotation of the thrust plate with the rotor.

FIG. 13 is a schematic drawing of valve embodiment 600, showing all of the bed ports and function ports, which would in fact be at a single radius from axis 43 as shown in FIG. 14. Likewise, FIG. 13 shows all of the loading pistons, which would be at a single radius substantially identical to or somewhat greater than the radius of the function ports from axis 43. FIG. 14 is section 623–624 of FIG. 13, and shows the annular pattern of the loading pistons at a somewhat greater radius and concentric with the function ports 50, 51 and 52. At the same radius as the function ports, pressure sensing ports 625, 626 and 627 (corresponding to positions in the valve surface lacking a function port) are positioned at 60° spacing from each other or from adjacent function port centers. Port 51 communicates to countercurrent blowdown flow control valve 132 via conduit 131 and transfer chamber 130, and by conduit 631 to cylinder 613. Port 625 communicates by conduit 634 to cylinder 614. Port 50 communicates by conduit 635 to cylinder 615, and to feed supply conduit 126 via transfer chamber 127. Port 626 communicates by conduit 636 to cylinder 616. Port 627 communicates by conduit 637 to cylinder 617. Purge exhaust port 52 communicates by conduit 640 to blank cylinder 641, communicating with chamber 642 between the rotor and the thrust plate 610, and thence to exhaust conduit 121, which by conduit 643 vents annular chamber 644 between the stator 36 and seal 112. No piston is needed in cylinder 641, since that cylinder is vented to the lower pressure.

Embodiment 600 of the first distributor valve is energized by the externally imposed pressure difference between the higher pressure in conduit 126 and the lower pressure in conduit 121. The axial thrust load exerted by the ring of annular pistons approximately balances the pressure distribution on the valve surface, so that excessively high contact pressures can be avoided.

FIG. 15

Another embodiment 700 of the distributor valves, here illustrated for a first distributor valve, uses a single eccentric loading device to achieve approximate radial balance of the rotor, while balancing the stator using loading pistons analogous to those used in the rotor of embodiment 600. Components common to first distributor valve 37 of FIG. 1 are denoted with equivalent reference numerals.

Valve embodiment 700 is shown in cross section, taken across the plane of bed conduits 20 and 23 connecting bed port 30 and 33 respectively to beds 2 and 5, which are not shown. Sealing connections between each of the bed conduits in housing 38 and corresponding bed ports in stator 36 are provided by fluid transfer sleeves, with fluid transfer sleeves 710 and 713 shown respectively for bed ports 30 and 33. The fluid transfer sleeves are sealed in the housing and stator by static seals 720 and 721. Compression springs 730 may optionally be provided to urge the fluid transfer sleeves toward the stator. The fluid transfer sleeves engage the stator against rotation relative to housing 38.

It will be evident that each fluid transfer sleeve exerts an axial thrust on the stator, corresponding to the pressure in that bed port acting on the axial area of each fluid transfer sleeve, plus the compression spring forces. Hence, the set of fluid transfer sleeves act like the loading pistons of embodiment 600, thrusting the stator to engage in sealing contact on sealing valve surface 45 against rotor 40. The force distribution will reflect the asymmetric pressure distribution in the bed ports at any instant, and will thus achieve partial balance with the pressure distribution across face 45.

Rotor 40 is rotated by shaft 42, sealed by shaft seal 116 with seal bushing 740. Thrust loads on rotor 40 from the pressure distribution on the valve surface 45 are reacted by a thrust slipper 750 against thrust plate 751 mounted on housing closure 752. The thrust slipper 750 is part of the rotor assembly. Thrust slipper 750 is enabled to move axially to contact thrust plate 751 by sliding or flexing of seal means 756 (which may be a piston ring seal, or a flexing diaphragm or bellows); and is thereby sealed to rotor 40, and is also urged against thrust plate 751 by compression spring 757 (which may be a metallic coil spring or an elastomeric spring, in the latter case possibly integral with a flexing diaphragm seal 756).

Feed port 50 on rotor 40 communicates to chamber 758 interior to thrust slipper 750, while exhaust port 52 communicates to interior chamber 759 of housing 38 external to piston 750. Chamber 758 communicates through the thrust plate 751 and end closure 752 to high pressure feed port 126, while chamber 759 communicates through housing 38 to low pressure exhaust port 121. Thrust plate 751 is secured to end closure 752 by dowels 761 and seal 762. End closure 752 is attached to housing 38 by capscrews 763.

Figure 15:
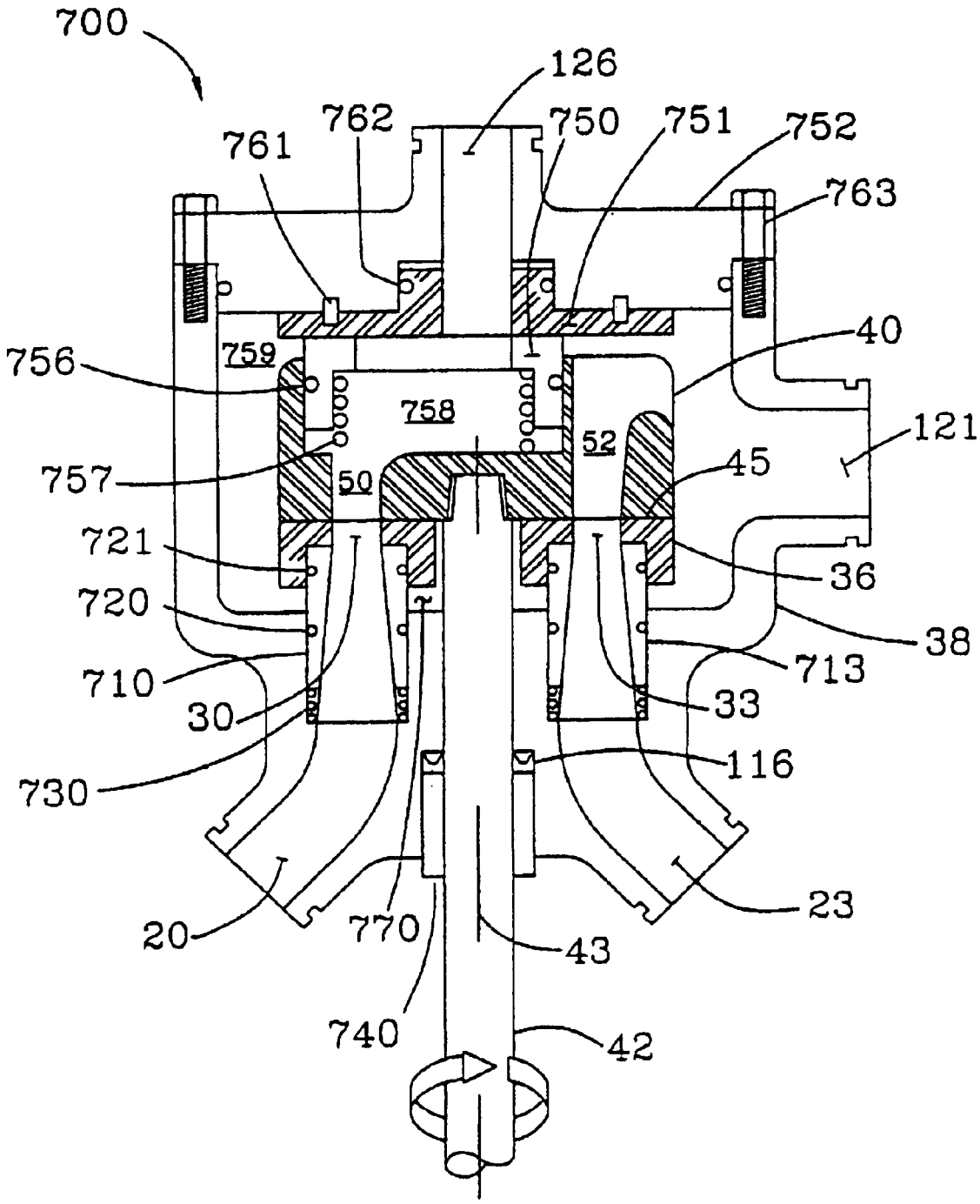
FIG. 15 is a longitudinal section of another pressure-balanced embodiment of the first distributor valve.

Thrust slipper 750 acts as fluid transfer means to convey feed fluid from the stationary housing to the rotor. The thrust slipper also loads the rotor against the valve surface 45, and hence the diameter of thrust slipper seal 756 must be sufficient to provide an effective piston energized by feed pressure in chamber 758 for positive sealing of the valve surface. With the thrust slipper eccentrically positioned as shown in FIG. 15, radially offset from axis 43 so as to load the valve rotor toward the high pressure feed port and away from the low pressure exhaust port, approximate balance can be obtained of the present distribution in the valve surface. This feature allows the valve to be loaded less heavily than would otherwise be necessary, and thus to operate with smaller internal forces, and with less frictional power loss and heat dissipation.

It is within the scope of the invention to mount thrust slipper concentrically to axis 43. The concentric configuration requires a somewhat larger thrust force (e.g. greater diameter of thrust slipper seal 756) to ensure positive sealing in valve surface 45, and rotor 40 is subject to a greater radial force to be reacted by bushing 740 or other radial bearing.

The clearance space 770 between stator 36, housing 38 and the fluid transfer sleeves may be used as a fluid flow passage, e.g. of countercurrent blowdown gas, in order to achieve enhanced convective cooling of the valve stator and sealing surface.

It will be seen that loading means to establish fluid sealing contact between the rotor and stator is provided by axially aligned fluid transfer sleeves sealing each bed port of the stator and providing fluid communication to the corresponding adsorbent bed of each bed port, with the fluid transfer sleeves having enough axially projected area with optional assistance of compression springs, so as to thrust the stator against the rotor. Alternative or supplementary loading means to establish fluid sealing contact between the rotor and stator are provided by a thrust slipper engaged by axially compliant sealing means to the valve rotor so as to define a chamber pressurized by feed fluid to thrust the rotor against the valve sealing surface.

FIG. 16

Referring back to the embodiment of FIG. 1, flow controls 61 to 66 are adjusted by controller 164 if these flow controls or adjustable orifices are provided as throttle valves, and are to be adjusted continuously while the apparatus is operating, they should be actuated simultaneously so that these flow controls present substantially identical orifice restrictions to light reflux gas flow at any time. Hence, the flow controls 61 to 66 may be ganged together mechanically for simultaneous actuation by controller 164.

Figure 16:
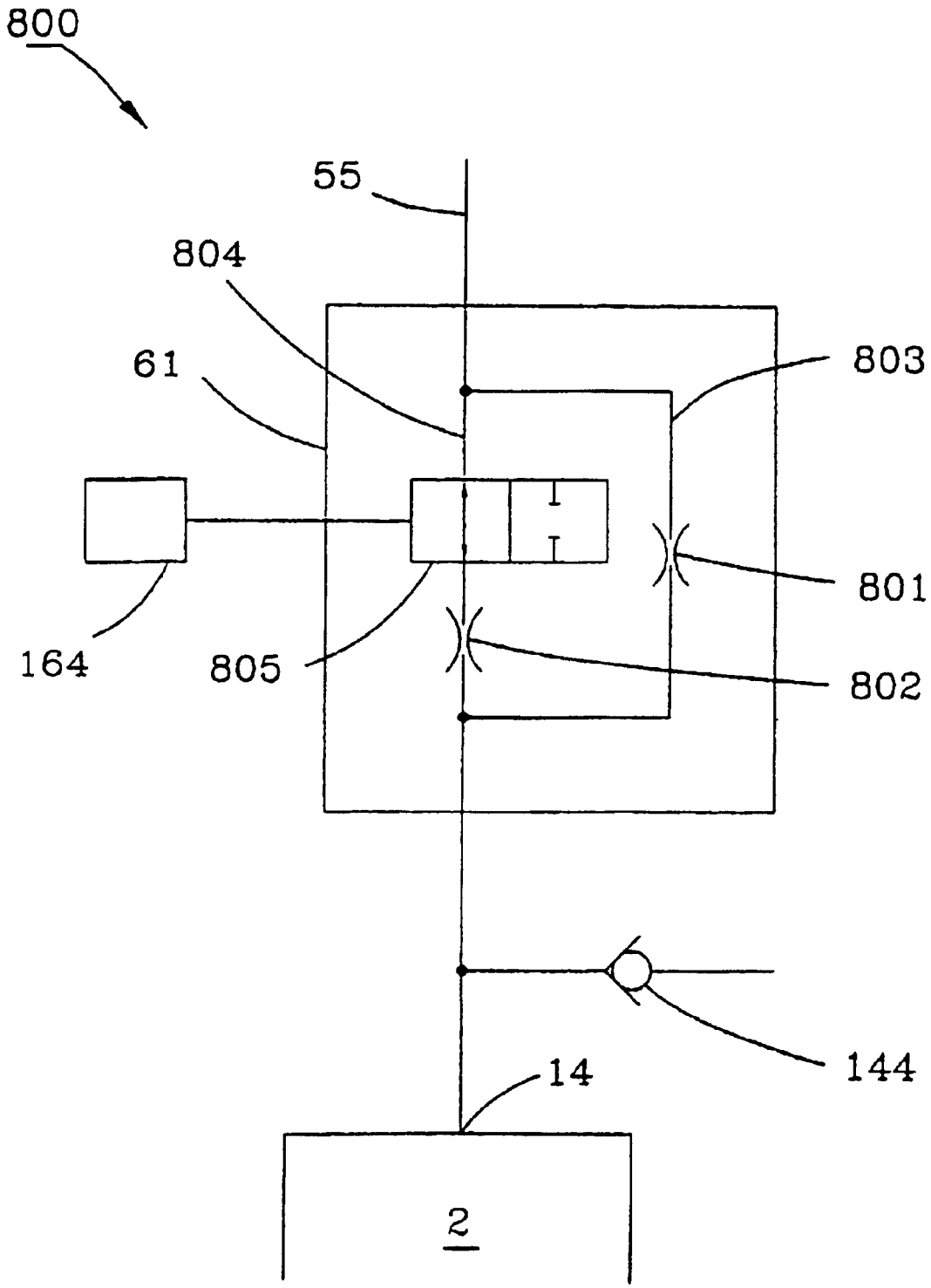
FIG. 16 shows an adjustable orifice with two discrete settings, applicable to the apparatus of FIG. 1.

FIG. 16 shows a simplified embodiment 800 in which flow controls 61 to 66 are adjustable only between two discrete settings. This discretely adjustable flow control is illustrated for flow control 61, it being understood that the identical device would be applied to flow controls 62 to 66. The adjustable orifice of flow control 61 has a more restrictive setting defined by fixed orifice 801, and a less restrictive setting defined by the combination in parallel of fixed orifices 801 and 802. Orifices 801 and 802 are respectively in conduits 803 and 804 branching in parallel between conduit 55 and second end 14 of bed 2. A two-way selector valve 805 in conduit 804 is actuated by controller 164. When selector valve 805 is open or closed, flow control 61 is respectively at its less or more restrictive setting. With similar two-way selector valves in each of the discretely adjustable flow controls 61 to 66 to switch these flow controls between substantially identical more and less restrictive settings, and simultaneous actuation by controller 164 of all six selector valves, a simplified control is achieved compared to the alternative coordinated actuation of continuously adjustable throttle valves.

The use of two discrete settings for flow controls 61 to 66 will be particularly suitable for applications in which a two speed drive 154 or motor 155 is used to operate the rotary distributor valves at two cycle frequencies. The less restrictive setting of the flow controls would be used at the higher cycle frequency. For a wide range of flow control adjustment, more than two settings may be provided by providing additional orifices in parallel.

It will be appreciated that the above described device of discretely adjustable flow controls or adjustable orifices, with two or possibly more discrete settings established by selector valves opening and closing supplemental orifices in parallel, may be applied to any of the flow controls in the present invention, including flow controls 61 to 66; adjustable orifices 96, 97 and 98; or flow control valve 132.

INDUSTRIAL APPLICABILITY

The present invention is applicable to hydrogen separation, air separation, and to many other gas or vapour separations. The invention overcomes barriers to the technical simplification and economic scale-up of highly efficient and productive gas separation equipment.

An important application is hydrogen recovery from refinery offgases or low BTU syngas. PSA has previously been applied most successfully to purification of hydrogen from hydrogen rich feed streams (such as high BTU syngas generated by steam reforming of methane), typically available at high pressure. PSA has not previously been found economic for recovery of hydrogen from lean or very low pressure feed streams. Demand for hydrogen is rapidly increasing in the petroleum refining industry, while that industry continues to burn large amounts of hydrogen in waste fuel gas streams.

The present invention has been tested experimentally for purification of hydrogen generated by steam reforming of methanol or partial oxidation of methane, and for hydrogen recovery from refinery hydrotreater offgases as well as from tail gas of conventional PSA systems.

A small industrial pilot plant according to the embodiment of FIG. 1 has been operated with a methanol reformer to produce hydrogen of 99.999% purity at flow rates sufficient for a 6 kilowatt fuel cell. A variable speed drive was used to operate the rotary distributor valves. Using the flow controls of FIG. 1, satisfactory operation was established with varying methanol reformate feed flow and pressure over a 4:1 range of cycle frequencies.

The present invention enables the use of simple multiport rotary distributor valves and cooperating flow controls, with adsorbent beds cycled at relatively high frequency, to recover hydrogen from lean and low pressure petroleum refinery offgases.

Typical application objectives are to recover hydrogen from a hydrotreater purge gas containing 30% hydrogen, supplied at a pressure of 8 atmospheres, while discharging tail gas depleted of hydrogen at 2 atmospheres total pressure. With adsorbent beds approximately 1.5 meters deep, containing 8/12 mesh pellets of suitable adsorbent (e.g. 13X zeolite, with a guard layer of alumina dessicant at the first end of the adsorbent beds), it is found that the apparatus of the invention can deliver high purity hydrogen at cycle periods of 20 to 30 seconds. High cycle frequency enables low adsorbent inventory. Having relatively shallow adsorbent beds, this apparatus can be delivered to an application site as a fully assembled modular skid. The small adsorbent inventory and simplified controls enable competitive performance and economics.

The invention may also be applied to concentrate oxygen from atmospheric air, using a zeolite adsorbent on which nitrogen is more readily adsorbed than oxygen at ambient temperature. The higher pressure of the process will be above atmospheric, and the lower pressure may be atmospheric or subatmospheric. Suitable adsorbents include zeolite 13X or 10X. The typically six bed cycles of the present invention achieve higher product recovery than conventional PSA or VSA air separation cycles, while high cycle frequency again enables a low adsorbent inventory.

It will be understood that the different aspects of the present invention may be expressed with much diversity and in many combinations other than the specific examples described above, under the scope of the following claims.

We claim:

[1. Process for separating first and second components of a feed gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency of the process defining a cycle period; providing for the process a number "N" of substantially similar adsorbent beds of the adsorbent material, with said adsorbent beds having first and second ends; and further providing for the process a first rotary distributor valve connected in parallel to the first ends of the adsorbent beds and a second rotary distributor valve connected in parallel to the second ends of the adsorbent ends, with flow controls cooperating with the first and second distributor valves; introducing the feed gas mixture at substantially the higher pressure to the first distributor valve; and rotating the first and second distributor valves so as to perform in each adsorbent bed the sequentially repeated steps within the cycle period of:

(A) supplying a flow of the feed gas mixture at the higher pressure through the first distributor valve to the first end of the adsorbent bed during a feed time interval, withdrawing gas enriched in the second component from the second end of the adsorbent bed, and delivering a portion of the gas enriched in the second component as a light product gas, (B) withdrawing a flow of gas enriched in the second component as light reflux gas from the second end of the adsorbent bed through the second distributor valve, so as to depressurize the adsorbent bed from the higher pressure toward an equalization pressure less than the higher pressure, while controlling the flow so that the pressure in the bed approaches the equalization pressure within an equalization time interval, (C) withdrawing a flow of light reflux gas enriched in the second component from the second end of the adsorbent bed through the second distributor valve, so as to depressurize the adsorbent bed from approximately the equalization pressure to an intermediate pressure less than the equalization pressure and greater than the lower pressure, while controlling the flow so that the pressure in the bed reaches approximately the intermediate pressure within a cocurrent blowdown time interval, (D) withdrawing a flow of gas enriched in the first component from the first end of the adsorbent bed through the first distributor valve, so as to depressurize the adsorbent bed from approximately the intermediate pressure to approach the lower pressure, while controlling the flow so that the pressure in the bed approaches the lower pressure within a countercurrent blowdown time interval, (E) returning a low of light reflux gas enriched in the second component from the second distributor valve to the second end of the adsorbent bed at substantially the lower pressure, while withdrawing gas enriched in the first component from the first end of the adsorbent bed and through the first distributor valve over a purge time interval, said flow of gas enriched in the second component from the second distributor valve being withdrawn from another of the adsorbent beds which is undergoing cocurrent blowdown step (C) of the process, (F) returning a flow of light reflux gas enriched in the second component from the second distributor valve to the bed, so as to repressurize the adsorbent bed from approximately the lower pressure to approach the equalization pressure, while controlling the flow so that the pressure in the bed approaches the equalization pressure within an equalization time interval, said flow of gas enriched in the second component from the second distributor valve being withdrawn from another of the adsorbent beds which is undergoing equalization step (B) of the process, (G) admitting gas to the adsorbent bed, so as to further repressurize the adsorbent bed from the equalization pressure toward the higher pressure, while controlling the flow so that the presence in the bed approaches the higher pressure within a repressurization time interval, (H) cyclically repeating steps (A) to (G).]

[2. The process of claim 1, further varying cycle frequency so as to achieve desired purity, recovery and flow rate of the light product gas.]

[3. The process of claim 1, in step (G) returning a flow of light reflux gas enriched in the second component from the second distributor valve to the bed, so as to repressurize the adsorbent bed to approach the higher pressure, while controlling the flow so that the pressure in the bed approaches the higher pressure within a repressurization time interval, the flow of gas enriched in the second component from the second distributor valve being withdrawn from another of the adsorbent beds which is undergoing feed step (A) of the process.]

[4. The process of claim 1, in step (G) admitting feed gas from the first distributor valve to the bed, so as to repressurize the adsorbent bed to approach the higher pressure, while controlling the flow so that the pressure in the bed approaches the higher pressure within a repressurization time interval.]

[5. The process of claim 1, supplying the feed gas mixture during the initial part of step (A) to the first end of the adsorbent bed, and then supplying a second feed gas with a greater concentration of the first component during the later part of step (A) to the first end of the adsorbent bed.]

[6. The process of claim 5, recompressing a portion of the gas enriched in the first component withdrawn from the first end of an adsorbent bed during step (D) or preferably (E) to substantially the higher pressure, and supplying this portion of the gas enriched in the first component as the second feed gas through the first distributor valve to the first end of the adsorbent bed in the latter part of the feed time interval in step (A).]

[7. The process of claim 6, providing a feed selector valve to alternatingly direct the feed gas mixture or the heavy reflux gas through the first distributor valve to the first end of the adsorbent bed, and switching the feed selector valve at a frequency "N" times the cycle frequency.]

[8. The process of claim 1, exchanging light reflux gas enriched in the second component between a bed undergoing step (B) and another bed undergoing step (F) directly through the second distributor valve in substantially identical equalization time intervals for those steps (B) and (F).]

[9. The process of claim 8, in which the cycle period is approximately the sum of the feed time interval, twice the equalization time interval, the cocurrent blowdown time interval, the purge time interval, and the repressurization time interval.]

[10. The process of claim 1, further providing adjustable orifices interposed between the second end of each adsorbent bed and the second distributor valve as flow controls cooperating with the second distributor valve, one adjustable orifice being provided for each bed and the orifices being adjusted simultaneously so as to have substantially identical settings at any time, and adjusting the orifices so as to control the flow at the second ends of the adsorbent beds in steps (B), (C), (E), (F) and (G).]

[11. The process of claim 10, further providing a product delivery check valve for each adsorbent bed communicating from the second end of that adsorbent bed to a light product manifold, and delivering the light product through the product delivery check valves.]

[12. The process of claim 10, in which the time intervals of steps (B), (C) and (F) are substantially equal, so that the intermediate pressure remains substantially constant as the orifices are adjusted.]

[13. The process of claim 10, in which the orifices are adjusted by switching between discrete settings.]

[14. The process of claim 1, further delivering the light product gas through the second distributor valve.]

[15. The process of claim 1, further providing an adjustable orifice in the second distributor valve as a flow control cooperating with the second distributor valve, and adjusting the orifice so as to control the flow in step (C).]

[16. The process of claim 1, further providing adjustable orifices in the second distributor valve as flow controls cooperating with the second distributor valve, and adjusting the orifices so as to control the flow at the second ends of the adsorbent beds in steps (B), (C), (E), (F) and (G).]

[17. The process of claim 1, further providing a flow control cooperating with the first distributor valve to control the flow in step (D) so as to establish the intermediate pressure relative to the higher and lower pressures, such that the ratio of the difference between the intermediate pressure and the lower pressure to the difference between the higher pressure and the lower pressure is in the range of approximately 0.15 to 0.25.]

[18. The process of claim 1, further controlling the flow in step (A) by establishing the volumetric flow of the feed gas mixture at the higher pressure.]

[19. The process of claim 1, further controlling the flow in step (A) by regulating the pressure at which the product gas is withdrawn.]

[20. The process of claim 1, further controlling the flow in each step so as to avoid damaging the adsorbent by transient high flow velocity in the adsorbent bed.]

[21. The process of claim 1, further controlling the flow velocities in steps (B), (C), (D), (F) and (G) so that the ratio of the peak flow velocity to the average flow velocity in those steps will not exceed approximately 2:1.]

[22. Apparatus for separating first and second components of a feed gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency of the process defining a cycle period, the apparatus including (a) a number "N" of substantially similar adsorbent beds of the adsorbent material, with said adsorbent beds having first and second ends defining a flow path through the adsorbent material;

(b) light product delivery means to deliver a light product flow of gas enriched in the second component from the second ends of the adsorbent beds;

(c) a first rotary distributor valve connected in parallel to the first ends of the adsorbent beds; the first distributor valve having a stator and a rotor rotatable about an axis; the stator and rotor comprising a pair of relatively rotating valve elements, the valve elements being engaged in fluid sealing sliding contact in a valve surface, the valve surface being a surface of revolution coaxial to the axis, each of the valve elements having a plurality of ports to the valve surface and in sequential sliding registration with the ports in the valve surface of the other valve element through the relative rotation of the valve elements; one of said valve elements being a first bed port element having N first bed ports each communicating to the first end of one of the N adsorbent beds; and the other valve element being a first function port element having a plurality of first function ports including a feed port, a countercurrent blowdown port and a purge exhaust port; with the bed ports spaced apart by equal angular separation between adjacent ports; and with the first function ports and first bed ports at the same radial and axial position on the valve surface so that each first function port is opened in sequence to each of the N first bed ports by relative rotation of the valve elements;

(d) a second rotary distributor valve connected in parallel to the second ends of the adsorbent beds and cooperating with the first distributor valve; the second distributor valve having a stator and a rotor rotatable about an axis; the stator and rotor comprising a pair of relatively rotating valve elements, the valve elements being engaged in fluid sealing sliding contact in a valve surface, the valve surface being a surface of revolution coaxial to the axis, each of the valve elements having a plurality of ports to the valve surface and in sequential sliding registration with the ports in the valve surface of the other valve element through the relative rotation of the valve elements; one of said valve elements being a second bed port element having N second bed ports each communicating to the second end of one of the N adsorbent beds; and the other valve element being a second function port element having a plurality of second function ports including a plurality of light reflux withdrawal ports and light reflux return ports, with each light reflux return port communicating through the second function element to a light reflux withdrawal port; with the bed ports spaced apart by equal angular separation between adjacent ports; and with the function ports and bed ports at the same radial and axial position on the valve surface so that each function port is opened in sequence to each of the N bed ports by relative rotation of the valve elements;

(e) drive means to establish rotation of the rotors, and hence relative rotation of the bed port elements and the function port elements of the first and second distributor valves, with a phase relation between the rotation of the rotors and angular spacing of the function ports of the first and second distributor valves so as to establish for each adsorbent bed communicating to corresponding first and second bed ports the following sequential and cyclically repeated steps at a cycle frequency for those bed ports;

(i) the first bed port is open to the feed port, while light product gas is delivered by a light product delivery means, (ii) the second bed port is open to a light reflux withdrawal port, (iii) the first bed port is open to the countercurrent blowdown port, (iv) the first bed port is open to the purge exhaust port, while the second bed port is open to a light reflux return port;

(f) countercurrent blowdown flow control means cooperating with the first distributor valve;

(g) light reflux flow control means cooperating with the second distributor valve;

(h) feed supply means to introduce the feed gas mixture to the feed port of the first distributor valve at substantially the higher pressure; and (i) exhaust means to remove gas enriched in the first component from the purge exhaust port of the first distributor valve.]

[23. The apparatus of claim 22, in which the second function ports of the second distributor valve include light reflux withdrawal ports to withdraw light reflux gas enriched in the second component from beds undergoing feed, equalization depressurization and cocurrent blowdown steps; light reflux return ports to supply gas enriched in the second component to beds undergoing purge, equalization pressurization and repressurization steps; and each light reflux withdrawal port communicates to a light reflux return port through an orifice; so as to establish by rotation of the distributor valve rotors the following sequential and cyclically repeated steps for the adsorbent bed of:

(A) the first bed port is open to the feed port, while the second bed port is open to a light reflux withdrawal port communicating through an orifice to a light reflux return port open to repressurize another bed undergoing step (F) below, and light product gas is delivered from the second end of the adsorbent bed by a light product delivery valve;

(B) the second bed port is open for pressure equalization to a light reflux withdrawal port communicating through an orifice to a light reflux port open to another bed undergoing step (F) below, so as to equalize the pressures of the beds;

(C) the second bed port is open for countercurrent blowdown to a light reflux withdrawal port communicating through an orifice to a light reflux port open for purging to another bed undergoing step (E) below;

(D) the first bed port is open to the countercurrent blowdown port, so as to depressurize the bed to the lower pressure;

(E) the first bed port is open to the purge exhaust port, while the second bed port is open to a light reflux return port so as to receive light reflux gas from another bed undergoing step (C) above;

(F) the second bed port is open to a light reflux return port so as to receive light reflux gas from another bed undergoing step (B) above for pressure equalization; and (G) the second bed port is open to a light reflux return port so as to receive light reflux gas from another bed undergoing step (A) above for repressurization.]

[24. The apparatus of claim 23, in which the first bed port is opened to the feed port before light product gas is delivered from the second end of the adsorbent bed by the light product delivery valve, so that repressurization of the adsorbent bed is achieved at least in part by feed gas.]

[25. The apparatus of claim 23, in which each light reflux withdrawal port communicates to a light reflux return port through an orifice which is an adjustable orifice, provided as light reflux flow control means.]

[26. The apparatus of claim 23, in which the first bed port element is the stator, and the first function port element is the rotor, of the first distributor valve; and the second bed port element is the stator, and the second function port element is the rotor, of the second distributor valve.]

[27. The apparatus of claim 26, in which each light reflux withdrawal port communicates to a light reflux return port through an orifice which is an adjustable orifice within the rotor, provided as light reflux flow control means.]

[28. The apparatus of claim 26, with actuator means to control the adjustable orifice from outside the rotor while the rotor is revolving.]

[29. The apparatus of claim 28, in which the adjustable orifice is provided as a throttle valve within the rotor, and the actuator means is coupled to the throttle valve through a mechanical linkage.]

[30. The apparatus of claim 26, in which each light reflux withdrawal port communicates to a light reflux return port through an adjustable orifice which is a throttle valve external to the rotor, with transfer chambers having rotary seals providing fluid communication between the throttle valve and the light reflux withdrawal port, and between the throttle valve and the light reflux return port.]

[31. The apparatus of claim 26, in which the light reflux control means includes an adjustable orifice or throttle valve interposed between the second end of each adsorbent bed and the second distributor valve, and means to adjust the orifices or throttle valves simultaneously such that each of the adjustable orifices will have substantially identical settings at each time.]

[32. The apparatus of claim 31, in which each of the adjustable orifices is provided by at least two fixed orifices in parallel, with one of the fixed orifices always open to flow, and another orifice being opened or closed to flow by a selector valve so as to establish respectively less restrictive and more restrictive discrete settings of the adjustable orifice.]

[33. The apparatus of claim 31, in which the light product delivery means for each adsorbent bed is provided as a check valve enabling flow from the second end of that adsorbent bed to a product delivery manifold.]

[34. The apparatus of claim 31, in which the light product delivery means is the second distributor valve, provided with a light product delivery port; and a check valve is provided in parallel with each adjustable orifice or throttle valve so as to permit unrestricted flow from the second end of each bed to the second distributor valve.]

[35. The apparatus of claim 22, with the drive means being a variable speed drive controlled by a cycle frequency controller.]

[36. The apparatus of claim 22, with the drive means including angular velocity variation means to vary the angular velocity of the rotor of the first distributor valve at a multiple "N" times the cycle frequency, so as to extend the time interval during which a function port is substantially fully open to each bed port, and to reduce the time interval during which that function port is substantially closed to any bed port, while maintaining the minimum angular velocity of the rotor during the cycle to be greater than zero.]

[37. The apparatus of claim 36, in which the angular velocity variation means is provided as a pair of noncircular gears in the drive train to the first distributor valve.]

[38. The apparatus of claim 22, in which a function port is shaped so as to provide a gradually opening orifice so as to impose relatively intensive throttling at the beginning of a blowdown, pressurization or equalization step.]

[39. The apparatus of claim 22, in which the valve surface of a distributor valve is a flat disc normal to the axis of that valve, and with loading means to establish fluid sealing sliding contact between the stator and rotor of that distributor valve.]

[40. The apparatus of claim 39, in which the loading means is in part provided by compression springs.]

[41. The apparatus of claim 39, in which the loading means includes a plurality of axially aligned loading pistons disposed in a coaxial annulus within the valve rotor at substantially the radius of the function ports, with each piston communicating to the local gas pressure at its axially projected position in the valve surface, and the pistons reacting against a rotating thrust plate so as to achieve approximate radial balance.]

[42. The apparatus of claim 39, in which the loading means to establish fluid sealing contact between the rotor and stator is provided by axially aligned fluid transfer sleeves for each bed port of the stator and providing sealed fluid communication to the corresponding adsorbent bed of each bed port, with the fluid transfer sleeves having enough axially projected area so as to thrust the stator against the rotor in sealing contact, with optional assistance of compression springs.]

[43. The apparatus of claim 42, in which a clearance space between stator and the fluid transfer sleeves may be used as a fluid flow passage to achieve enhanced convective cooling of the valve.]

[44. The apparatus of claim 39, in which the loading means to establish fluid sealing contact between the rotor and stator is provided by a thrust slipper reacting against a stationary thrust plate and engaged by axially compliant sealing means to the valve rotor so as to define a chamber pressurized by feed fluid to thrust the rotor against the valve sealing surface.]

[45. The apparatus of claim 44, in which the thrust slipper provides fluid transfer means to convey feed fluid from a stationary housing to the rotor.]

[46. The apparatus of claim 44, in which the thrust slipper is eccentrically positioned and radially offset from the axis of said rotor toward the high pressure feed port and away from the low pressure exhaust port, so as to balance approximately the pressure distribution in the valve sealing surface.]

*47. A rotary distributor valve comprising:*

*a stator housing having a stator housing face, wherein the stator housing face comprises at least three fluid port openings, and a central axis of rotation;*

*a rotor having a rotor face, wherein the rotor face comprises at least two fluid port openings and a central axis of rotation disposed coaxially with the axis of rotation of the stator housing face;*

*an intermediate valve element having first and second faces, a central axis of rotation disposed coaxially with the axes of rotation of the stator housing and rotor faces, and a plurality of fluid ports extending between the first and second faces, which fluid ports are aligned with the fluid port openings in one of the stator housing face or the rotor face, wherein the first face of the intermediate valve element faces the rotor face and is in fluidly sealing contact with the rotor face, and the second face of the intermediate valve element faces the stator housing face and is in fluidly sealing contact with the stator housing face; and*

*loading means operable to exert a sealing force on the rotary valve, which urges the stator housing face and the rotor face towards each other to promote fluidly sealing contact between the rotor and stator housing faces and the first and second faces of the intermediate valve element respectively;*

*wherein the stator housing face and the rotor face are rotatable relative to each other about their common coaxial axis of rotation;*

*wherein the rotor additionally comprises at least one fluid passage connecting a first fluid port opening in the rotor face to a second fluid port opening in the rotor face; and*

*wherein the loading means comprises gas pressure loading means, and the gas pressure loading means is operable to exert distributed variable sealing force around a sealing face of the rotary distributor valve, said distributed variable sealing force being responsive to the distribution of pressure in the fluid port openings in the stator housing face.*

*48. A rotary distributor valve comprising:*

*a stator housing having a stator housing face, wherein the stator housing face comprises at least three fluid port openings, and a central axis of rotation;*

*a rotor having a rotor face, wherein the rotor face comprises at least two fluid port openings and a central axis of rotation disposed coaxially with the axis of rotation of the stator housing face; and*

*an intermediate valve element having first and second faces, a central axis of rotation disposed coaxially with the axes of rotation of the stator housing and rotor faces, and a plurality of fluid ports extending between the first and second faces, which fluid ports are aligned with the fluid port openings in one of the stator housing face or the rotor face, wherein the first face of the intermediate valve element faces the rotor face and is in fluidly sealing contact with the rotor face, and the second face of the intermediate valve element faces the stator housing face and is in fluidly sealing contact with the stator housing face;*

*wherein the stator housing face and the rotor face are rotatable relative to each other about their common coaxial axis of rotation;*

*wherein the rotor additionally comprises at least one fluid passage connecting a first fluid port opening in the rotor face to a second fluid port opening in the rotor face; and*

*wherein the rotor additionally comprises flow control means to control fluid flow within the at least one fluid passage.*

*49. The rotary distributor valve according to claim 47 wherein the intermediate valve comprises a stator secured to the stator housing face.*

*50. The rotary distributor valve according to claim 47 wherein the intermediate valve element fluid ports are aligned with the fluid port openings in the stator housing face, and the intermediate valve element remains rotationally stationary relative to the stator housing face during relative rotation of the stator housing face and the rotor face.*

*51. The rotary distributor valve according to claim 47 additionally comprising rotary drive means operable to rotate the rotor face and stator housing face relative to each other.*

*52. The rotary distributor valve according to claim 51 wherein the rotary drive means is operable to vary the speed of relative rotation between the rotor face and stator housing face.*

*53. The rotary distributor valve according to claim 47 wherein the stator housing face and rotor face comprise metal materials, and the intermediate valve element comprises polymeric or carbon materials.*

*54. The rotary distributor valve according to claim 47 wherein the valve is a rotary pressure swing adsorption distributor valve.*

*55. The rotary pressure swing adsorption distributor valve according to claim 54 additionally comprising flow control means to control fluid flow within the at least one fluid passage.*

*56. The rotary pressure swing adsorption distributor valve according to claim 55 additionally comprising rotary drive means operable to rotate the rotor face and stator housing face relative to each other.*

*57. The rotary pressure swing adsorption distributor valve according to claim 56 wherein the rotary drive means is operable to vary the speed of relative rotation between the rotor face and stator housing face.*

*58. The rotary pressure swing adsorption distributor valve according to claim 56 additionally comprising loading means operable to exert a sealing force on the rotary valve, which urges the stator housing face and the rotor face towards each other to promote fluidly sealing contact between at least one of the rotor and stator housing faces and the first and second faces of the intermediate valve element respectively.*

*59. The rotary pressure swing adsorption distributor valve according to claim 56 wherein the intermediate valve comprises a stator secured to the stator housing face.*

*60. The rotary pressure swing adsorption distributor valve according to claim 56 wherein the intermediate valve element fluid ports are aligned with the fluid port openings in the stator housing face, and the intermediate valve element remains rotationally stationary relative to the stator housing face during relative rotation of the rotor face and stator housing face.*

*61. The rotary distributor valve according to claim 60 wherein the intermediate valve element is fixedly attached to the stator housing face.*

*62. The rotary pressure swing adsorption distributor valve according to claim 56 wherein the stator housing face, rotor face and first and second intermediate valve element faces are configured as surfaces of revolution.*

*63. The rotary pressure swing adsorption distributor valve according to claim 62 wherein the stator housing face, rotor face and first and second intermediate valve element faces are configured as discs.*

*64. The rotary pressure swing adsorption distributor valve according to claim 63 wherein the intermediate valve element is a plate.*

*65. A rotary distributor valve comprising:*

*a stator housing having a stator housing face, wherein the stator housing face comprises at least three fluid port openings, and a central axis of rotation;*

*a rotor having a rotor face, wherein the rotor face comprises at least two fluid port openings and a central axis of rotation disposed coaxially with the axis of rotation of the stator housing face;*

*an intermediate valve element having first and second faces, a central axis of rotation disposed coaxially with the axes of rotation of the stator housing and rotor faces, and a plurality of fluid ports extending between the first and second faces, which fluid ports are aligned with the fluid port openings in one of the stator housing face or the rotor face, wherein the first face of the intermediate valve element faces the rotor face and is in fluidly sealing contact with the rotor face, and the second face of the intermediate valve element faces the stator housing face and is in fluidly sealing contact with the stator housing face;*

*wherein the stator housing face and the rotor face are rotatable relative to each other about their common coaxial axis of rotation;*

*wherein the rotor additionally comprises at least one fluid passage connecting a first fluid port opening in the rotor face to a second fluid port opening in the rotor face;*

*wherein the valve is a rotary pressure swing adsorption distributor valve;*

*flow control means to control fluid flow within the at least one fluid passage;*

*rotary drive means operable to rotate the rotor face and stator housing face relative to each other; and*

*loading means operable to exert a sealing force on the rotary valve, which urges the stator housing face and the rotor face towards each other to promote fluidly sealing contact between at least one of the rotor and stator housing faces and the first and second faces of the intermediate valve element respectively;*

*wherein the loading means comprises distributed gas pressure loading means, the stator housing face and rotor face each comprise at least six fluid port openings, the intermediate valve element comprises at least six fluid ports, and the rotary drive means comprises an electric rotary drive motor.*

*66. The rotary pressure swing adsorption distributor valve according to claim 65 wherein the electric rotary drive motor is a variable speed electric rotary drive motor.*

*67. The rotary pressure swing adsorption distributor valve according to claim 66, wherein the stator housing face and rotor face comprise metal materials, and the intermediate valve element comprises at least one polymeric material.*

*68. The rotary pressure swing adsorption distributor valve according to claim 67 wherein the intermediate valve element comprises at least one carbon material.*

* * * * *